United States Patent
Shafir et al.

(10) Patent No.: US 7,707,287 B2
(45) Date of Patent: Apr. 27, 2010

(54) VIRTUAL HOST ACCELERATION SYSTEM

(75) Inventors: Micha Shafir, Givat Shmuel (IL); Mark Shahaf, Rehovot (IL)

(73) Assignee: F5 Networks, Inc., Seattle, WA (US)

(*) Notice: Subject to any disclaimer, the term of this patent is extended or adjusted under 35 U.S.C. 154(b) by 989 days.

(21) Appl. No.: 10/102,810

(22) Filed: Mar. 22, 2002

(65) Prior Publication Data
US 2003/0182423 A1 Sep. 25, 2003

(51) Int. Cl.
*G06F 15/173* (2006.01)

(52) U.S. Cl. .............. 709/225; 709/217; 709/218; 709/219; 709/227; 709/228; 709/229; 709/237; 711/3; 711/113; 711/118; 711/144

(58) Field of Classification Search ......... 709/227–229, 709/237, 217–219; 711/118, 3, 113, 144
See application file for complete search history.

(56) References Cited

U.S. PATENT DOCUMENTS

| | | | | |
|---|---|---|---|---|
| 5,864,852 | A * | 1/1999 | Luotonen | 726/14 |
| 6,061,796 | A * | 5/2000 | Chen et al. | 726/15 |
| 6,094,485 | A * | 7/2000 | Weinstein et al. | 380/30 |
| 6,128,623 | A * | 10/2000 | Mattis et al. | 707/103 R |
| 6,167,438 | A * | 12/2000 | Yates et al. | 709/216 |
| 6,178,160 | B1 | 1/2001 | Bolton et al. | |
| 6,185,598 | B1 * | 2/2001 | Farber et al. | 709/200 |
| 6,240,461 | B1 | 5/2001 | Cieslak et al. | |
| 6,256,712 | B1 | 7/2001 | Challenger et al. | |
| 6,289,358 | B1 * | 9/2001 | Mattis et al. | 707/203 |
| 6,304,915 | B1 * | 10/2001 | Nguyen et al. | 709/250 |
| 6,389,460 | B1 * | 5/2002 | Stewart et al. | 709/217 |
| 6,418,544 | B1 * | 7/2002 | Nesbitt et al. | 714/43 |
| 6,457,054 | B1 * | 9/2002 | Bakshi | 709/227 |
| 6,484,143 | B1 * | 11/2002 | Swildens et al. | 705/1 |
| 6,606,663 | B1 * | 8/2003 | Liao et al. | 709/229 |

(Continued)

OTHER PUBLICATIONS

Reardon, Marguerite, "A Smarter Session Switch: Arrowpoint's CS Session Switches Boast The Brains Needed For E-Commerce," Data Communications, Jan. 1999, title page, pp. 3, 5, 18.

(Continued)

*Primary Examiner*—Alina N. Boutah
(74) *Attorney, Agent, or Firm*—Darby & Darby P.C.; John W. Branch

(57) ABSTRACT

A method and a system for improving Web hosting performance, enhancing content distribution and security on the Internet and stabilizing WEB Site connectivity, by means of creating a TCP terminating buffer around subscriber WEB Sites. A DNS agent diverts client requests to WEB Sites to a Virtual Host Accelerating (VHA) Site in closest proximity. The VHA Site comprises a set of physically identical computer units and processing is enhanced on those units by means of a hardware devise to accelerate database searches. The VHA determines if the client request is of a permitted type and if the request can be processed from recycled data. Both static and dynamic requests can be serviced from recycled material and only in certain circumstances are requests forwarded to the WEB Sites by means of permanent open connections. In some cases SSL requests are also served from recycled material. The client receives a response via the VHA Site thereby severing all direct connectivity between the client and the target WEB Sites.

37 Claims, 20 Drawing Sheets

VHA Architecture and Components

U.S. PATENT DOCUMENTS

| | | | | |
|---|---|---|---|---|
| 6,640,302 B1* | 10/2003 | Subramaniam et al. | ..... | 713/169 |
| 6,801,927 B1* | 10/2004 | Smith et al. | ..... | 709/202 |
| 6,810,431 B1* | 10/2004 | Narisi et al. | ..... | 709/250 |
| 6,938,088 B1* | 8/2005 | Hericourt | ..... | 709/227 |
| 6,978,298 B1* | 12/2005 | Kuehr-McLaren | ..... | 709/223 |
| 7,055,028 B2* | 5/2006 | Peiffer et al. | ..... | 713/151 |
| 7,062,570 B2* | 6/2006 | Hong et al. | ..... | 709/238 |
| 7,062,756 B2* | 6/2006 | Kamen et al. | ..... | 717/127 |
| 7,072,843 B2* | 7/2006 | Menninger et al. | ..... | 705/8 |
| 7,076,568 B2* | 7/2006 | Philbrick et al. | ..... | 709/250 |
| 7,139,811 B2* | 11/2006 | Lev Ran et al. | ..... | 709/217 |
| 7,149,803 B2* | 12/2006 | Douglis et al. | ..... | 709/228 |
| 7,167,448 B2* | 1/2007 | Wookey et al. | ..... | 370/231 |
| 7,177,945 B2* | 2/2007 | Hong et al. | ..... | 709/238 |
| 7,305,450 B2* | 12/2007 | Rescorla et al. | ..... | 709/208 |
| 7,343,412 B1* | 3/2008 | Zimowski | ..... | 709/226 |
| 7,571,217 B1* | 8/2009 | Saxena | ..... | 709/217 |
| 2002/0010798 A1* | 1/2002 | Ben-Shaul et al. | ..... | 709/247 |
| 2002/0048269 A1* | 4/2002 | Hong et al. | ..... | 370/389 |
| 2002/0091844 A1* | 7/2002 | Craft et al. | ..... | 709/230 |
| 2002/0099850 A1* | 7/2002 | Farber et al. | ..... | 709/245 |
| 2002/0138699 A1* | 9/2002 | Okamura | ..... | 711/133 |
| 2002/0143892 A1* | 10/2002 | Mogul | ..... | 709/217 |
| 2002/0161983 A1* | 10/2002 | Milos et al. | ..... | 711/202 |
| 2003/0014650 A1* | 1/2003 | Freed et al. | ..... | 713/189 |
| 2003/0069947 A1* | 4/2003 | Lipinski | ..... | 709/220 |

OTHER PUBLICATIONS

Hewitt, John R. et al., "Securities Practice And Electronic Technology," Corporate Securities Series, (New York: Law Journal Seminars-Press) 1998, title page, bibliography page, pp. 4.29-4.30.

* cited by examiner

VHA Architecture and Components

BEM Socket Management

FEM Data Flow

CRM Data Flow

System View

Opened Events

Site 15: BEM 17 down (25-05-01 14:05)
Site 15: FEM 12 busy (25-05-01 16:02)
Site 8: FEM 3 busy (24-05-01 02:13)

Opened Events

Figure 6

Site 15

| LM 0 00302afd881a | FEM 7 00ea2af7681a | CRM 0eaeaea7681a | BEM 11 00e63333681a |
|---|---|---|---|
| LB 1 10305afd881a | FEM 12 03304acd881a | CRM 0eae8977681a | BEM 13 0aaaaaa3681a |
| | FEM 8 00ea2af7651a | CRM 3 0eaeaeaa681a | BEM 14 87654333681a |
| | FEM 4 035555cd881a | CRM 0eae89778888 | |
| | FEM 5 343434f7681a | | |
| | FEM 6 03398989881a | | |

Site View

Figure 7

Unit information
Site 8: Unit 03:33:DF:E3:52:1A

| | |
|---|---|
| Date: | 12-05-2001 13:23 |
| Unit ID: | 12 |
| Type: | FEM |
| IP Address 1: | 192.168.1.12 |
| IP Address 2: | 212.140.3.24 |
| Status: | OK |
| | |
| CPU: | 80% |
| SWAP: | 12M |
| Disk Space: | 1000M |

VHA Unit Information

Figure 8

Site 13 Configuration

| | |
|---|---|
| Location: | CA |
| Contact: | Bob Rob |
| Phone: | 405-865-9876 |
| e-mail: | bobrob@stam.com |
| Number of FEMs: | 12 |
| Number of CRMs: | 7 |
| Number of BEMs: | 5 |
| LB Address: | 212.23.4.57 |
| LM Address: | 212.23.4.58 |
| BEMs Address Range: | 212.23.4.59-64 |
| Default Gateway 1: | 212.23.4.1 |
| Default Gatway 2: | 212.23.4.2 |

VHA Site Configuration

Figure 9

FEM: Site 7, Unit 00454a7baca2

Command    ps - A

| PID TTY | TIME CMD |
|---|---|
| 1 ? | 00:00:06 lnit |
| 2 ? | 00:00:00 kflushd |
| 3 ? | 00:00:00 kupdate |
| 4 ? | 00:00:00 kpiod |
| 5 ? | 00:00:33 kswapd |
| 6 ? | 00:00:00 md_thread |
| 9 ? | 00:00:00 khubd |
| 178 ? | 00:00:00 portmap |
| 202 ? | 00:00:00 syslogd |
| 206 ? | 00:00:00 klogd |
| 208 ? | 00:00:00 httpd |

Backdoor

Figure 10

FEM Statistics
Site 7, Unit 00454a7baca2

| | |
|---|---|
| Total Requests (Rate): | 2000 |
| Cacheable (Rate): | 1370 |
| Non-Cacheable (rate): | 630 |
| Total Mbytes Returned (rate) | 6.5 |

Unit Statistics

Figure 11

Site 7 Statistics

| | |
|---|---|
| Number of Sessions: | 220,000 |
| Number of Free Entries: | 950,000 |
| Free Disk Space (GB): | |
| Hits (%) | 65 |

Rate

| | |
|---|---|
| Rate of No-Resources Events: | 0 |
| Rate of Requests: | 22,000 |
| Rate of Cacheable: | 17,300 |
| Rate of Non-Cacheable: | 4,700 |
| Out traffic ( FEMs MB/sec ) | 6.2 |
| In traffic ( FEMs MB/sec ) | 2.1 |

Site Statistics

Figure 12

Global Configuration

Control Centers
1     212.123.456
2     137.1.145.7
3     196.5.67.240

Managers

| | |
|---|---|
| 203.45.6.78 | 36000 |
| 201.67.44.127. | 36001 |
| 103.45.6.78 | 36002 |
| 101.67.44.127 | 36003 |

Global Configuration

Figure 13

FEM Configuration

Memory Buffer Entries (K):  30
Main Queue Size (K):  10
Default Queue Size (K):  3
Linked List Size (K):  100
Number of Users Threads:  10

FEM Configuration

Figure 14

CRM Configuration

| | |
|---|---|
| Main Memory Buffer Entries (K): | 30 |
| Auxiliary Memory Buffer Entries (K): | 10 |
| Main Queue Size (K): | 10 |
| Default Queue Size (K): | 3 |
| Number of Pending Threads: | 10 |
| Number of Disk Threads: | 15 |
| Clock Resolution (seconds): | 30 |
| Small Objects Initial Weight: | 10 |
| Small Objects Weight Increment: | 1 |
| Medium Objects Initial Weight: | 20 |
| Medium Objects Weight Increment: | 2 |
| Large Objects Initial Weight: | 30 |
| Large Objects Weight Increment: | 4 |
| Huge Objects Initial Weight: | 40 |
| Huge Objects Weight Increment: | 8 |
| Forced Aging Limit (K): | 100 |

CRM Configuration

Figure 15

BEM Configuration

| | |
|---|---|
| Main Memory Buffer Entries (K): | 30 |
| Auxiliary Memory Buffer Entries (K): | 10 |
| Main Queue Size (K): | 10 |
| Default Queue Size (K): | 3 |
| Number of WEB Threads: | 10 |
| Maximal Number of Sockets (K): | 60 |
| Maximal Number of Sites (K): | 100 |
| WEB Response Time-Out (sec): | 5 |
| Sleep before Poll (ms): | 1 |

BEM Configuration

Figure 16

Clients Management

Find [                    ]

| Site ID | Site Name |
|---------|-----------|
| 1 | www.amazon.com |
| 2 | www.magnifire.com |
| 3 | www.cpan.org |
| 4 | www.volvo.com |
| 5 | www.e-trade.com |
| 6 | www.google.com |
| 7 | www.opensource.org |
| 8 | www.goodlife.com |
| 9 | www.netvision.net.il |
| 10 | www.mitos.co.il |
| 11 | www.nova.co.uk |

Clients Management Menu

Figure 17

Client Configuration

Name: Stam ltd
Domain Name: www.stam.com
Contact: Bob Brown
Address: 4510 Yellow Av
San Jose, CA
Phone: 405-999-9897
Fax: 405-999-9899
E-mail: Bob.Brown@stam.com

| IP Address | Static TTL | Dynamic TTL | Resources |

Clients Configuration Menu

Figure 18

Client IP Addresses

Static TTL

Dynamic TTL

| Resources | |
|---|---|
| Resource | Value |
| Average Response Size (K) | 4 |
| Ratio of Cacheable Requests | 0.7 |
| Number of Opened Sockets | 500 |
| Number of Objects | 2000 |
| Desired Hit Rate | 0.8 |
| Requests Rate | 120 |

Client Resources

Figure 22

Enhanced Disk Access Process

VIRTUAL HOST ACCELERATION SYSTEM

FIELD AND BACKGROUND OF THE INVENTION

1. Field of the Invention

The present invention relates to a system for improving Web hosting performance, content distribution and security on the Internet, by means of creating a TCP terminating buffer around subscriber WEB Sites.

2. Description of the Related Art

The Internet is a global collection of millions of computers, all networked together. This network typically allows all of the computers to communicate with one another in a client/server relationship. As used in this document a "client" can be broadly construed to mean any computer or device or application or set thereof that is connected in any manner to a network of any type and connects to a "server" on that network to perform some operation or to request a service. The "server", as used in this document, can be broadly construed to mean a computer or device or application or set thereof that serves the clients connected to it by means of providing services and responses to requests.

To illustrate how a client/server relationship operates over the Internet the following example is presented. A user of the Internet, a citizen of Almaty, Kazakhstan, knows that books can be obtained inexpensively at a WEB Site called Amazon, based over 10,000 kilometers away in America. The user's client computer is connected to an Internet Service Provider (hereafter referred to as ISP) via a modem and regular telephone line, which in turn is connected to the rest of the Internet by high-speed backbone fiber-optic lines, undersea cables and satellite links. Using client browser software like Netscape or Microsoft Internet Explorer, the user types in Amazon's Uniform Resource Locator (hereafter referred to as URL) in his/her Internet browser software. A URL is a character string that identifies an Internet document's exact name and location. For example, Amazon's homepage URL is www.amazon.com. The ISP routes the request to a Domain Name Server (hereafter referred to as DNS). An essential function of a DNS is to allow users to locate computers on the Internet by domain name. The DNS maintains a "whois" library of domain names, addresses and server localities. The DNS translates the required domain name into a 32-bit IP address, which is unique on the Transmission Control Protocol/Internet Protocol (hereafter referred to as TCP/IP) network. The DNS translates Amazon's current address to "207.71.182.16", and forwards the request to the Amazon server. The Amazon server recognizes that a client using HyperText Transport Protocol (hereafter referred to as HTTP) has requested to "get" a page. The server retrieves the page and sends it down the same communication channels to the client browser. A split second after requesting the price of a book from Amazon, the user in Almaty views the information neatly displayed on the computer screen.

The basics are very simple. In theory, a client machine connecting to a server machine at any distance over a fast Internet connection should be able to request and receive files speedily. However, in real life many factors aggravate this process and thereby impact on performance and adversely effect the client, the server, the Internet and the entire data transfer process in general.

The Web page is typically a file that contains text, graphics, audio elements and more. HTML tags that describe how the file should be formatted and presented when a browser displays it on a screen, usually define the Web page. The tags are instructions that tell the Web browser how the page should look when displayed. The tags tell the browser to do things like change the font size or color, or arrange content in columns or around figures.

The HTML format typically contains several embedded references to rich content objects, such as images, which must be retrieved separately. After the client receives the server output, the client browser requests each embedded object referred to in the downloaded HTML files. These objects are often located on the original server, which then returns the objects to the user over the Internet. This last step is usually bandwidth intensive due to the size of the multimedia files in use. Clearly, pages having a large number of embedded objects can require significant download times.

A Web server that delivers standard "static" pages, i.e. pages that do not change, does not typically use excessive processing power. However, servers also deal with Web pages that are "dynamic" or change. For example, a search engine that allows keywords to be entered on an HTML form, and then creates a dynamic answer page based on the keywords entered. In this case, the Web server is not merely "looking up a file", but by using a dynamic scripting technique like Common Gateway Interface (CGI), it is processing information and generating a dynamic page based on the specifics of the query.

Over time Dynamic Pages have become even more complex and processor heavy. Dynamic page generation, also known as dynamic scripting, allows a Web site to assemble pages at run-time, based on various parameters. Delaying page content decisions until run-time affords a Web site significant flexibility in customizing page content. For example, the WEB Site could display up-to-date information on stock-on-hand, theatre ticket prices or the availability of airline seats. Real time on-line auctions can be conducted, and news can be drawn from a database and changed by the minute.

As e-business (Electronic Business) providers increasingly adopt dynamic page generation technologies, web and application server scalability is significantly reduced because pages are now generated "on demand". This places additional load on servers in order to retrieve and format the requested content. In many cases, bottlenecks associated with server side page generation is the dominant impediment to efficient page generation, and consequently, to the efficient delivery of Web content.

When a client requests a dynamic Web page, the request is passed from the Web server to the application server, which executes the script that generates the page. This step involves additional work on the part of the application server in order to retrieve and format the requested content. Content is typically retrieved from underlying database systems. Once the content is retrieved, additional steps may be required to format the content; for example, content data stored as XML must be rendered as HTML using an eXtensible Stylesheet Language Transformation (XSLT) processor. HTML is an interpreted language that places a heavy burden on the CPU. The server therefore performs significant work in order to output the HTML to the requesting client. Many simultaneous requests naturally impair server performance.

With the advent of multimedia on the Internet, Web servers are increasingly providing large files like videos and music for downloading. Thousands of hits at uncoordinated times, especially for large files, are detrimental to performance.

Internet users are steadily switching to broadband access as various types of Digital Subscriber Lines (DSL) and cable modems continue to penetrate the market. However, neither the servers, to which they are connecting, nor the ISPs and the hosting services are sufficiently prepared to meet the growing demand for content. The result is that users experience a delay in response time as pages take longer to download. The reasons for this can be found in the operation configuration of the server, its location and the various types of services used for IP traffic.

E-commerce has experienced phenomenal growth during the past few years, and this upward trend is expected to continue. This vast growth in revenue carries with it significant increases in Web traffic. Given the current state of Internet infrastructure technology, Internet sites are finding it difficult to support such extreme growth while maintaining acceptable qualities of service.

As seen from the above description, there are many factors that burden WEB Site and WEB Server performance and thereby curtail Internet performance in general.

Another element that adversely affects WEB performance is hostile attacks on the Internet. In spite of continually improving anti-virus programs and firewall systems, these attacks on computer systems are becoming even more sophisticated. A form of hostile attack that particularly chokes Internet transmission and cannot be combated by current tools, is a Denial of Service (hereafter referred to as DoS, sometimes referred to as a Distributed Denial of Service or DDOS) attack. A DoS attack is an attempt to overload a server's ability to respond by means of flooding it with requests for service. A DoS attack can be compared to a crowd at a stadium clamoring and pushing to get in through one gate. Due to the crush the gate clogs up and very few succeed in getting through. Even if the gate is wide, the number getting through is small compared to the number that could pass if there were more order and less jostling. As the gatekeeper is so preoccupied in securing order and resisting unlawful entry, also valid ticket holders to get delayed or blocked at the gate. The same occurs on the Internet during a Denial of Service attack. The aim of the attackers is not to access the attacked site but rather to swamp the site with meaningless "get" requests. The sheer number of requests arriving clogs up all available bandwidth and leaves no room for authorized traffic. Even it the firewall or site rejects the nonsense "get" requests the flooding damage is accomplished as authorized users are also prevented from accessing the site.

Attacks that swamp WEB Sites need not always be premeditated by malevolent attackers, but may occur naturally. For example, Valentines Day 2001 saw the major greeting card sites; Hallmark, American Greetings and eGreetings experience downtime as star-struck surfers innocently stormed the servers.

Speed is of essence on the Internet. Research shows that if a Web page requires longer than a few seconds to load, the majority of clients will abandon the request. [Zona Research, quoted in Interactive Week Vol. 6, No. 36, September 1996.] Site owners and hosting providers realize the dire necessity of providing bandwidth, performance and above all, Quality of Service (QoS) in order to retain and improve the Internet market.

To overcome the above-mentioned problems and many others, various methods have been devised, as follows:

Cache and Cache Servers are methods of storing frequently requested pages, files and images for quick retrieval. Instead of the server having to laboriously repeat the same steps for every separate request for the same page, the page is kept for a determined amount of time in an area designed for quick and easy access.

However, not all data can be cached. Whereas Static data is easily cached, Dynamic data is typically not cached. In addition, a typical cache machine is physically incapable of caching an abundance of data.

Proxy Servers are devices that reside between the server and the client with the intention of separating between them for security and operational purposes. Proxy servers have two main functions, to process and filter all Internet Protocol (IP) packets that are directed to them, and to decide which protocols and services can be served out of their caches. A Proxy offers a great range of protocol and caching support since it caches Hypertext Transport Protocol (HTTP), Secure Hypertext Transport Protocol (HTTPS), File Transfer Protocol (FTP) and, in some cases, streaming content such as RealAudio and PointCast. The client browser addresses the proxy server directly by setting specific parameters. However, the Proxy Server is lacking in several aspects, such as, a Proxy Server is susceptible to DoS attacks. In the case of DoS attacks, whereas the Proxy Server can successfully reject hostile and nonsense requests, as discussed, the aim of the DoS attack is to flood the server with requests and not necessarily to access it at all.

A similar method for keeping a network secure from intruders is a Firewall. The Firewall can be an application or may comprise a combination of routers and servers each performing some type of firewall processing, to control access to the network and monitor the flow of network traffic. A firewall filters out unwanted network traffic and wards off outside intrusion into a private network. However, for the firewall to reject a packet, it must first arrive at the firewall and be challenged and rejected. Thus the firewall method is ineffective in the case of DoS attacks.

Current methods typically have no control over incoming requests to hosted sites. They can manage outgoing traffic by use of forward caching and other sophisticated technology, whereby requests are intercepted and redirected to cache servers. However, there is no practical way of controlling large numbers of incoming requests. Therefore, when real or artificially induced (DoS) overload occurs, the overload can neither be regulated nor resolved.

An accepted current method for speeding web access is to "mirror" a copy WEB Site at close proximity to clients around the world. However the "mirror" sites solution is not ideal for several reasons. The WEB Site owners need to maintain contracts with alternative hosting providers for each mirror site. Separate sites engender security problems and diminish the WEB Site owner's control over their home site. Economically site duplication is not feasible, as due to overhead expenses additional sites are more expensive to maintain than just the parent site. Software or hardware like that provided by Cisco (Cisco Systems, Inc., San Jose, Calif.) and Nortel (Northern Telecom Limited, Brampton, Ontario, Canada, for mirroring and synchronizing sites is expensive, and presents an operational burden on the system. Decentralization or replications are often not effective solutions for a Web hosting service provider because of the large infrastructure and increase in bandwidth and storage capacity required.

Load Balancing is a method of fine-tuning a network in order to evenly distribute the data and/or processing across available resources and ensure that all available instances of an application are given a similar amount of requests. For example, in clustering, load balancing might distribute the incoming transactions evenly to all servers, or it might redirect them to the next available server that is sufficiently free to process the request.

Current Load Balancers are typically limited by their inability to handle an abundance of requests. Also, similar to other systems, a load balancer is susceptible to DoS attacks. If the load balancer is incapacitated due to a flood of requests, it cannot forward on authorized requests to be processed.

A possible way to cope with fluctuations of excessively heavy traffic that could swamp a WEB Site is to overload each Site with masses of additional and redundant server hardware. Most of the time, during regular traffic flow, this hardware would remain latent. However, especially in the case of WEB Sites that maintain mirror sites, the superfluous equipment solution is expensive and excessive.

U.S. Pat. No. 6,178,160 of Bolton et al., which is fully incorporated herein by reference, provides an algorithm to load balance clients across a network. This invention particularly concerns domain-name servers' network-address choices. According to the invention, name servers are dispersed geographically with the intention of reducing communications costs by having the web clients directed to the nearest application server. The name server selects the application server that appears closest to the source of the DNS request, and it gives the selected site's network address as the response to the DNS request.

This method has several drawbacks. In effect, rather than locating a single name server, it spreads name servers for measurement purposes, the physical location of these Name Servers being dependant on those network decisions and measurement. The client deals with the Name Server, by means of a client protocol, typically IMCP, TCP or UDP, to make a decision to where the request should be transferred. This exacts a burden and a security onus on the Name Server.

In addition, this system is reliant on cookies, the legality and ethics of which is questionable.

U.S. Pat. No. 6,240,461 of Cieslak et al., which is fully incorporated herein by reference, provides a method and apparatus for caching network data traffic. However this method is merely a port-80 cache server director that captures HTTP requests and redirects them to legacy cache servers. Its main purpose is to provide better and efficient outside access and to save bandwidth to the outgoing Internet pipelines. It deals neither with the problem of bandwidth to the origin server's pipelines nor with bandwidth and traffic redundancy to the application servers.

U.S. Pat. No. 6,256,712 of Challenger et al., which is fully incorporated herein by reference, provides a scaleable method for maintaining and making consistent updates to caches, by identifying several versions of objects, updating obsolete objects, quantitatively assessing how different two versions of the same object are, and/or maintaining consistency among a set of objects.

However, in the first place this problem would be averted if the system did not provide several versions of the same object.

The aim of many of the above and other solutions is to provide improved systems and methods to satisfy demand. However, this manner of providing solutions to problems of demand and bandwidth merely creates a vicious circle, wherein supply is increased by means of more advanced technology, faster communication links and superior accessibility. These methods inevitably result in increased user expectations and demand, thereby again imposing a strain on supply.

There is thus a widely recognized need for, and it would be highly advantageous to have, an alternative solution for enabling improved performance for Web servers, in terms of responding to data requests, and for furthermore enabling improved access to and retrieval of data between client browsers and host WEB Servers, such that augmenting WEB Site security and Website expansion are easily enabled.

Furthermore, it would be highly advantageous to have, a system that enables a more effective way of dealing with DoS attacks, so that such attacks could be identified and averted.

SUMMARY OF THE INVENTION

According to the present invention there is provided a means whereby a Hosting Site may enable a plurality of subscribing WEB Sites to vastly improve site performance, accelerate data access, enhance Web security and continually cater for more users, without the WEB hosting Sites having to invest in additional hardware.

The present invention is termed a Virtual Host Accelerating (hereafter termed VHA) Site. The VHA Site method provides a TCP terminator system between the requesting browser and the WEB Site by means of diverting all browser requests of subscribing WEB Sites for initial processing at the VHA Site. This VHA Site buffer system reduces bandwidth usage, accelerates performance and protects the WEB Site from harmful intrusions including Denial of Service (DoS) attacks.

The VHA System embraces several innovative methods. These include:

1. An aggregated multi-pipe architecture for terminating TCP requests, including HTTP, FTP and SSL protocol requests.
2. A DNS database derived from a global "WHOIS" mechanism that maintains a huge table enabling clients and DNS to be located on IP backbones and according to geographical distribution, to map clients to the best VHA Site.
3. A major element of the VHA System is that it acts as a massive flexible and fast content recycling machine.
4. The VHA Site maintains a set number of open connections with WEB Sites.
5. The VHA Site is split into a mesh of separate but similar modules, each performing specialized functions. This enables within the VHA Site a method of Self-Healing, Self-Customizing and Self-Optimization.
6. The majority of the machines utilize a hardware based Layer Two Lookup (hereafter referred to as L2L) or CAM (Content Addressable Memory) Lookup Engine. The L2L Engine is extremely fast dedicated hardware used to accelerate database searches. The L2L Engine currently handles 8 million items simultaneously, and performs up to 10 million elemental database seeks per second.
7. A superior method of recycling content which, by means of a Time To Live (hereafter referred to as TTL) mechanism, enables virtually all the WEB Site's data, including dynamic data, to be recycled.
8. Included in the VHA Site is a Traffic Controller that, due to an innovative design, is able to manage a colossal amount of simultaneous sessions (currently 7,000,000 per sec).
9. A Secure Socket Layer Accelerator (hereafter referred to as SSLA), which isolates SSL processing from the WEB Site.
10. An intra-site protocol that enables communication between intra-site components without excessively burdening the CPU.
11. A manner of storing data on disk that minimizes disk head search movement over the disk.

The following internal and external components currently comprise the VHA System. "Internal" and "external" are not necessarily related to physical location, but refer to components in FIG. 1 within and outside of box 20. Internal components are considered core components, however, external components are still either necessary VHA System components or relate to the functioning thereof.

An important feature of the hardware of the present invention is that the physical constituents of each component or unit are identical. As will be explained later in detail, this has important ramifications. Each unit basically comprises:
Strong rack mounted computer units.
One or more fast Ethernet interface cards.
Fast RAM (at present 512 Mb).
A large hard disk (at present 75 Gb).
One or more L2L Engines
In addition, the SSLA maintains at least one SSL Accelerator PCI Card.

The following components are considered external:
i. Client Browser software.
ii. A Request Router (hereafter referred to as RR).
   The RR is defined as the DNS authority of the Web Site being serviced by the VHA Site.
iii. A Domain Name System (hereafter referred to as DNS).
   The DNS refers to any prior art system that executes name resolution in order to map between logical names and network addresses in an Internet Protocol (IP) network. The DNS server maintains a database of domain names (host names) and their corresponding IP addresses. Subscribing Web Sites served by a VHA Site have the RR registered as their authoritative address.
iv. The external Virtual Private Network machine (hereafter referred to as VPN).
   A VPN uses encryption and access control software to bring privacy to communications over a public or an un-trusted data network. The external VPN is directly attached to the same local area network as the WEB Site. In one configuration of the VHA System the external VPN decrypts data that it receives from the internal VPN for transport to the WEB Site. At a later stage the external VPN encrypts a response for transportation to the requesting VHA Site.
v. The Web Sites serviced by the VHA Site.
vi. The VHA Control Center (hereafter referred to as VCC).
   The VCC is a central database that keeps VHA Site configurations, subscribing WEB site parameters, statistical information and analyses. The VCC is accessed from the VHA Management Station.
vii. The VHA Management Station (hereafter referred to as VMS).
   The VMS runs a GUI to access and manage the VCC and VHA Site system components.
viii. The Local Manager (hereafter referred to as LM)
   The LM distributes configurations, collects statistics and watches system health.

The following are internal components of the VHA Site:
i. The Remote Traffic Controller (hereafter referred to as RTC)
   The RTC is the entry point into the VHA Site for browser's request's. The RTC distributes the load of incoming requests by forwarding the request to the correct internal component target for further processing. The RTC also keeps track of all sessions.
ii. The VHA Front End Manager (hereafter referred to as FEM)
   The FEM is the unit responsible to forward requests for recycled or for WEB Site response and to provide a reply to browser requests.
iii. The Content Recycling Machine (hereafter referred to as CRM).
   The CRM is responsible for recycling data and for providing recycled responses.
iv. The VHA Back End Manager (hereafter referred to as BEM).
   The BEM accesses the WEB Site for responses to requests it receives from the CRMs and FEMs for data that is not available in recycled store.
v. The Secure Sockets Layer Accelerator (hereafter referred to as SSLA).
   The SSLA is responsible for accelerating SSL sessions.
vi. The internal VPN
   This option can be used with the SSLA to encrypt and decrypt data for transportation to and from the WEB Site.
vii. The Detailed Statistics Collector (hereafter referred to as DSC).
   The DSC is a machine running 3rd party software for collecting statistics.

The present invention successfully addresses the shortcomings of presently known configurations to rapidly expedite Internet hosting and browsing features and to guard the host WEB Site by providing a content recycler which acts as a terminator between the client browser and the host WEB Site.

BRIEF DESCRIPTION OF THE DRAWINGS

The invention is herein described, by way of example only, with reference to the accompanying drawings, wherein:
FIG. 6 is an illustration of Opened Events.
FIG. 7 is an illustration of the Site View.
FIG. 8 is an illustration of VHA unit information.
FIG. 9 is an illustration of the VHA Site configuration.
FIG. 10 is an illustration of Backdoor Information.
FIG. 11 is an illustration of Unit Statistics.
FIG. 12 is an illustration of Site Statistics.
FIG. 13 is an illustration of the Global Configuration.
FIG. 14 is an illustration of the FEM configuration.
FIG. 15 is an illustration of the CRM configuration.
FIG. 16 is an illustration of the BEM configuration.
FIG. 17 is an illustration of the Clients Management Menu.
FIG. 18 is an illustration of the Client Configuration Menu
FIG. 22 is an illustration of the Client Resources Screen.

DESCRIPTION OF THE PREFERRED EMBODIMENT

The present invention relates to a content acceleration system designed to accelerate and improve access, delivery and security of global Web Hosting systems. The invention further acts as a terminator to isolate, in preferred circumstances, target WEB Sites from direct contact with the Internet in general and requesting clients in particular.

The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Specifically, the present invention can be used to enhance browser/WEB Site access and site security by means of diverting connectivity via the present invention. This thereby allows increased bandwidth utilization, the transferal of tasks from the target Web Site to the VHA Site, improved performance and an advanced degree of control over Web Site access.

The principles and operation of a system and a method according to the present invention may be better understood with reference to the drawings and the accompanying description, it being understood that these drawings are given for illustrative purposes only and are not meant to be limiting.

Description of the Components

Figure 1:
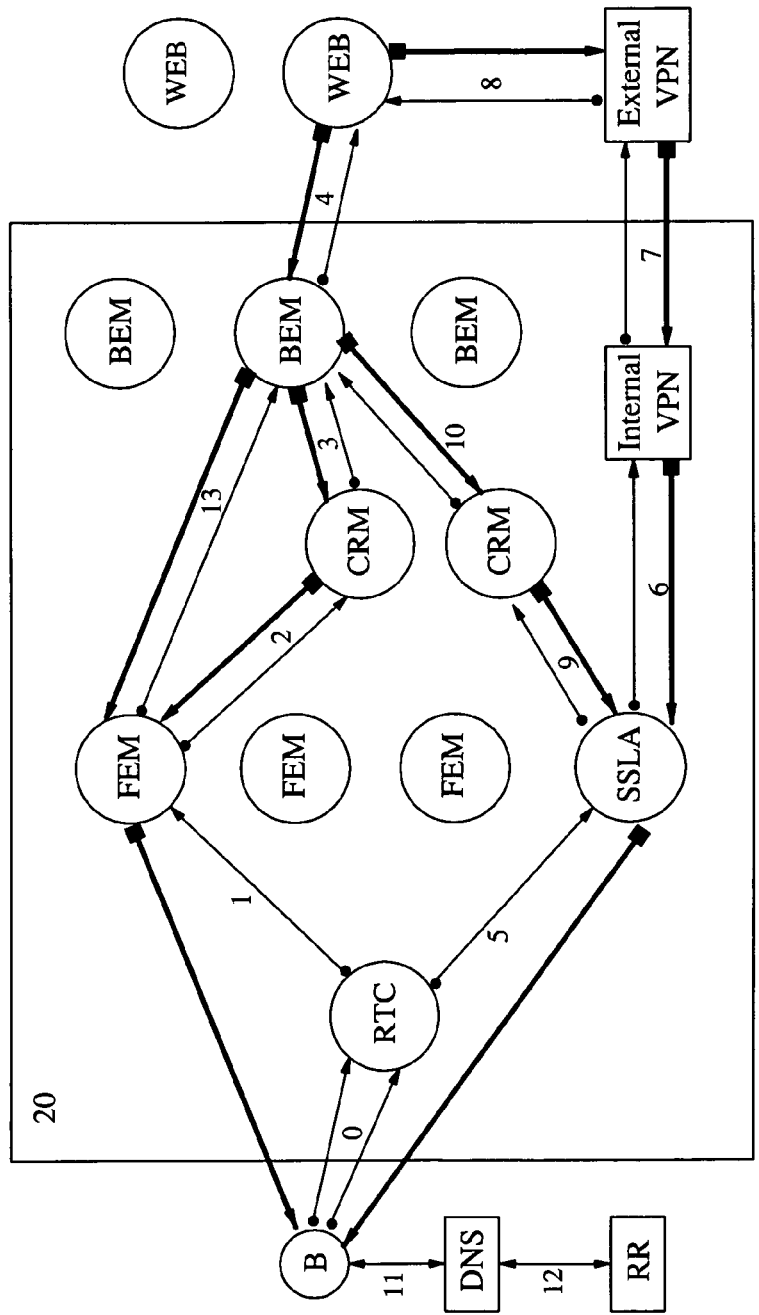
FIG. 1 is an illustration of VHA Architecture and Components

Referring now to the drawings, FIG. 1 illustrates the components of the present invention. The box 20 illustrates the VHA system, which is a combination of routing and recycling equipment. The VHA system is located at strategic places on the Internet, such as ISP backbones, etc. The function of the VHA system is to create a buffer in order to deflect and protect Web servers and to accelerate WEB performance. The VHA Site accomplishes these functions by intercepting the flow of a data request from client browser software B to a WEB Site (WEB), and its subsequent processing by the VHA Site's powerful content recycling process.

Several internal and external components currently comprise the VHA System.

External Components

The following components are considered external to the actual VHA Site, but are either necessary VHA System components or relate to the functioning thereof:

i. The Client Browser and Browser Software (Referred to as B in FIG. 1).

ii. The Domain Name System (DNS).

This refers to any prior art system that executes name resolution in order to map between logical names and network addresses in an Internet Protocol (IP) network. The DNS server maintains a database of domain names (host names) and their corresponding IP addresses. Subscribing Web Sites served by a VHA Site have the VHA RR registered as their authoritative address.

iii. The VHA Request Router (RR).

The RR is defined as the DNS authority of Web Sites being serviced by the VHA Site.

The RR can be placed anywhere on the Internet but should typically be located at a backbone for better performance. When a DNS receives a request for a WEB Site that is a participating member of the VHA System it transfers the request to a RR. The RR, instead of sending the request to the target WEB Site, determines where is the nearest VHA Site to the requestor and forwards the request there. The VHA Site then either fully processes the request, or at least initially processes it before forwarding the request to the WEB Site. This function enhances security, preserves bandwidth and speeds up response time. It is obvious that a browser requesting a service from a server in close proximity or over the most efficient Internet backbone will be dealt with more efficiently than by a server at a distance.

In determining which is the nearest VHA Site, the assumption is that the majority of browsers define their default DNS to the ISP that they are functionally closest to. The RR maintains a database of all core Internet backbone providers (Internet backbone is defined as a high-speed transmission facility, or an arrangement of such facilities, designed to interconnect lower-speed distribution channels or clusters of dispersed user devices.), ISPs, NSPs (Network Service Providers), Networks, their Autonomous System Numbers (ASN) and corresponding geographical location.

The RR database is constructed from WHOIS databases that are readily available at a several of Internet sites. The database is currently constructed from data obtained from the following sites:

| | |
|---|---|
| www.caida.org | Whois service |
| Whois.radb.net | IP to AS and AS to list of networks. |
| Route-views.oregon-ix.net | IP to AS. |
| www.ispworld.com | List of backbone providers |

An autonomous system (hereafter referred to as an AS) is an administrative domain wherein all member components share route information. An AS is a separate Internet with a unique number. An ISP is generally an AS. Currently, the backbones ASs are determined from a file provided by Oregon University that is updated every few hours. This file provides all reasonable paths between networks to a group of central routers that are dispersed throughout the backbones. Autonomous Systems with the highest occurrences are considered backbone Autonomous Systems.

At present the RR uses a backbone AS to backbone ID table, and a network to backbone ID table, to build the required proximity tables.

Certain mapping tables are manually decided on, including a country/state to nearest VHA Site table and backbone ID to nearest VHA Site table. As such, the meaning of "nearest" may vary in various circumstances.

The main database compiled from this information is the networks to country and backbones ID table. Similar tables include ones that map Network to Country, and backbone AS into backbone ID.

Based on this table the RR returns to the DNS requesting a WEB Site the addresses of three nearest VHA Sites defined either geographically or in terms of a backbone or as some mixture of both criteria. For isolated countries the browser will be mapped to the VHA Site within closest geographical proximity. For countries like the U.S.A. where there is a developed Internet backbone system the browser is mapped to the VHA Site along the shortest backbone path. It should be noted that as the RR provides to the browser the address of the VHA Site, or more specifically of the VHA Site's RTC, the browser does not see the WEB Site's actual address. This has significant security ramifications.

Having determined the nearest VHA Site, the request is forwarded there for processing.

The RR makes use of at least two fast Ethernet interfaces for speedy routing of requests to the VHA Site. The RR utilizes a L2L Engine to facilitate accelerated database searches for the best VHA Site. The RR is synchronized with a redundant RR machine in case of failure.

iv. The External Virtual Private Network Machine (VPN).

VPN technology uses encryption to bring privacy to communications over a public or an un-trusted data network. The external VPN is directly attached to the same local area network as the WEB Site. The VPN decrypts data that it receives from the VHA Site's internal VPN and encrypts the WEB Site's response for transportation back to the VHA Site.

A VPN is not a necessary component for all VHA Sites. VHA Sites may either not support SSL acceleration or may use the SSL Sessions Method (to be explained later).

v. The Web Sites Serviced by the VHA Site.

vi. The VHA Site Control Center (VCC)

The VCC is a central database that keeps VHA Site configurations and subscribing WEB site parameters. The VCC comprises several units including the VMS, LM and DSC, which participate in the VHA Site management functions.

One function of the VCC is to maintain a central database. At present the database is maintained on readily available mySQL or mini SQL. Included in the database are VHA Site configurations, subscribing WEB site parameters, latest stable software versions, detailed VHA Site information (including service logs and other information), supported WEB sites parameters, internal statistics required for maintenance purposes, external statistics that may be required by clients and network events logs.

Other functions of the VCC include distributing configurations, collecting statistics, and monitoring system health, periodic poll of VHAs site managers, creating statistical reports and sending the reports to network managers and clients. Another VCC function is to update the RR when the VHA status changes, for example if a VHA Site is off-line, heavily loaded or when a served WEB Site IP address changes. Served WEB Sites register at the VCC.

For redundancy purposes multiple VCCs are installed. One machine is configured as the active VCC and the others are synchronized backups.

vii. The VHA Management Station (VMS)

The VMS provides a GUI for connecting to the VCC and thereby to manage, configure and monitor the VHA System and components.

Some services provided by the VMS include:
Real time display of the network.
Real time display of any selected VHA.
Display of critical events and messages.
Access to repository.
Remote reboot of VHA and/or single units.
Backdoor access.
Service database.
Access to various statistics.
On-line configuration changes.

The VMS's graphical interface provides for easy management of the VHA Site. Several samples of the GUI management windows follow.

Figure 5:
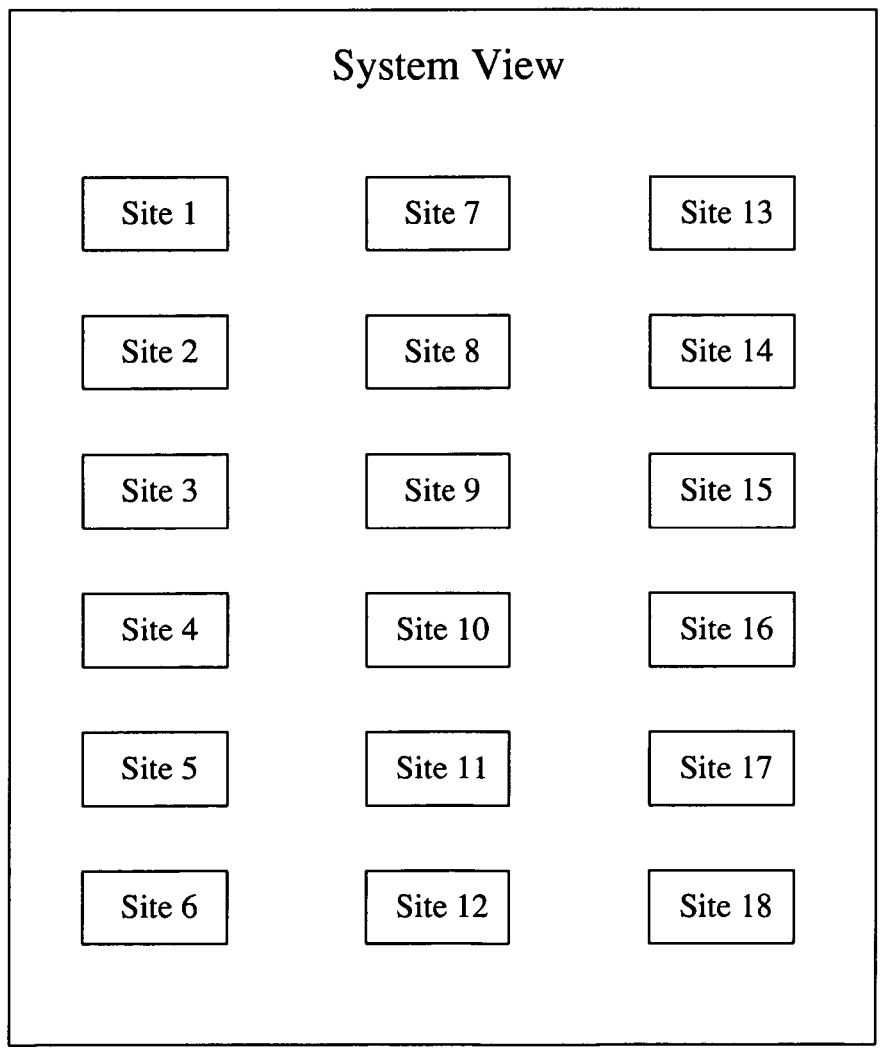
FIG. 5 is an illustration of the System View.

FIG. 5 displays a System View Menu that refers to all registered VHA sites. To allow the system operator to easily scan the System View screen for problems, a color code is used to indicate the status of VHA Sites. Possible actions include, remove site/VCC/VMS, open site, global log, site log, move, global configuration and add VMS.

FIG. 6 lists opened and unresolved events. Possible actions include a forced removal of the event, display unit information, open site, open unit log and open site log. The Logs exhibit a history of events. The logs can be opened, deleted and filtered by criteria including a range of dates, global, site and unit.

FIG. 7 represents a Site View. The Site View includes a list of all VHA units colored according to their status. Each unit icon includes the unit type (RTC, LM, FEM, CRM or BEM), eth0 MAC address and unit ID. The list of actions include open unit log, open site log, remove unit, configure site, display unit information, provide unit backdoor information, display site and unit statistics.

FIG. 8 represents the detailed unit information including the unit's current parameters and critical information. Possible actions include opening the unit log.

FIG. 9 represents the site configuration. Possible actions include opening the site log.

FIG. 10 represents backdoor information.

FIG. 11 displays unit statistics. Options include displaying statistics in graphical format.

FIG. 12 displays global VHA System site statistics. Options include displaying statistics in graphical format.

FIG. 13 displays the Global Configuration. This menu accesses a display of the FEM configuration (as can be seen in FIG. 14), the CRM configuration (as can be seen in FIG. 15), and the BEM configuration (as can be seen in FIG. 16). Similarly, the VMS displays the RTC configuration.

FIG. 17, the Clients Management screen, displays list of all subscribing host WEB Site clients. Options include find client, add and remove client, client configuration and client statistics.

Figure 19:
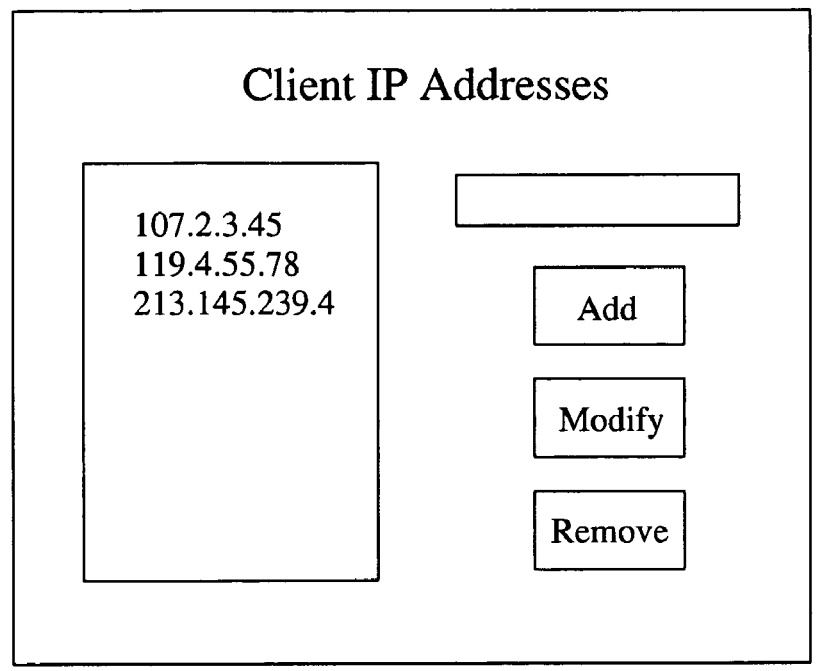
FIG. 19 is an illustration of the Client IP Address screen.
Figure 20:
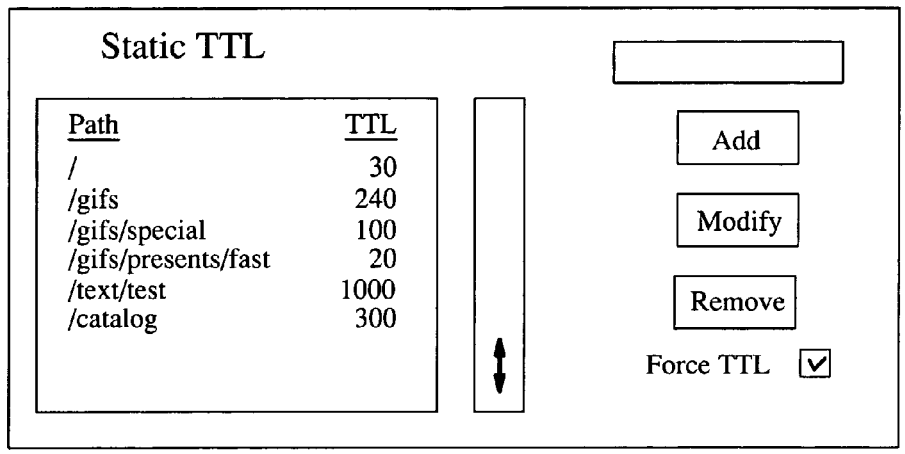
FIG. 20 is an illustration of the Static TTL screen.
Figure 21:
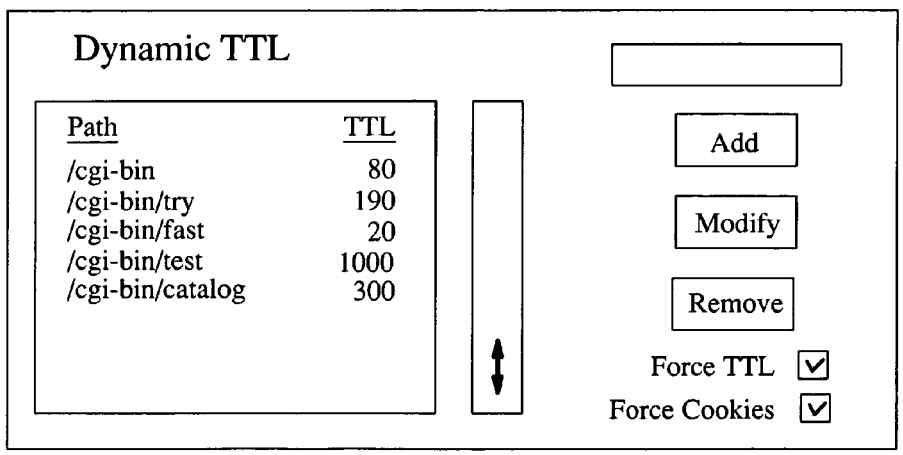
FIG. 21 is an illustration of the Dynamic TTL screen.

FIG. 18 details the client configuration menu. Options include display of IP addresses (as can be seen in FIG. 19), static TTL (as can be seen in FIG. 20), dynamic TTL (as can be seen in FIG. 21), and resources (as can be seen in FIG. 22).

viii. The Local Manager (LM)

The main function of the LM is to distribute configurations, collect statistics and inspect system health.

The LM is the first VHA System unit to boot up. The internal address of the LM is set within the network 192.168.1.0. The LM also has a pre-defined external address and default gateway address.

On initialization, the LM performs several tasks including:

The LM synchronizes software versions with VCC. This ensures that the LM maintains the latest software versions for all VHA Site units. The LM manages an internal FTP server to synchronize software versions and configurations of VHA Site units.

The LM downloads configuration information to units including configuring the external IP addresses of the RTC and of the BEM. It also prepares configurations for each VHA site unit.

The LM listens to all internal traffic and verifies that all internal IP addresses are unique. If IP addresses are duplicated then it forces a change of address of the conflicting units.

The LM listens for request to provide unit type. The first requesting unit is nominated as the RTC. Next the FEMs are allocated, thereafter the CRMs and finally the BEMs. During this procedure the LM synchronizes system units clocks. The LM also reallocates unit IDs where duplicates occur. Finally the LM initiates a start command to units, in the following order; BEMs, CRMs, FEMs and lastly to the RTC. Start commands are acknowledged. Only after receiving a "ready" acknowledgement from each unit does the LM allow the RTC to start up.

The LM controls authorized backdoor access for administration purposes to internal VHA Site units.

The LM synchronizes supported WEB sites parameters.

After boot up the LM performs several other functions including:
Responding to VCC requests.
Sending alarms upstream. For example, the LM notifies the VCC of important events, like unit failures.
Periodically polling all VHA System units. The responses include; a unit time-stamp, values of critical variables, values of statistical variables and debug variables.

Periodically (typically every 12 hours) collecting non-on-line statistics, analyzing the data and sending summary values to the VCC.

Periodically (typical every 24 hours) collecting statistical data from the DSC, analyzing it and sending a summary to the VCC.

Periodically synchronizing VHA site clocks.

Distributing on-line configuration changes.

Updating the RTC on the status of FEMs.

Updating the FEMs on the status of CRMs and BEMs.

FEM—Specific Management

A FEM variable that the LM keeps tabs on is the number of opened sockets used for communicating with browsers. It is critical to verify that the number of opened sockets does not exceed reasonable limits.

Collected statistics returned with keep alive include:
1. Number of client requests.
2. Number of requests forwarded to CRM.
3. Number of requests forwarded to BEM.
4. Return bytes counter to requesting browsers The FEM keeps a table of the following fields:
1. Number of requests.
2. Number of static requests.
3. Number of requests forwarded to CRM.
4. Number of requests forwarded to BEM.
5. Number of bytes sent to the users.

CRM—Specific Management

A CRM critical variable that the LM tracks includes the number of free objects. At present, each CRM is limited to 2,000,000 objects for recycling. Therefore free objects are defined as 2,000,000 minus number of currently recycled objects.

The following are typical CRM statistics
1. Number of requests.
2. Number of hits.
3. Number of objects.
4. Number of forced aging.
5. Forced aging threshold.

The CRM keeps a table of the following fields:
1. Number of requests.
2. Number of hits.

RTC—Specific Management

A critical variable that the LM keeps tabs on includes the number of free entries in the RTC table The RTC can presently track up to 7,000,000 sessions.

The following are typical RTC statistics
1. Number of free entries.
2. Number of SYNC requests.

BEM—Specific Management

A BEM critical variable that the LM keeps tabs on includes the number of opened sockets to each WEB Site.

The following are typical BEM statistics
1. Number of CRM requests.
2. Number of FEM requests.
3. Number of requests waiting for resources.
4. Return bytes counter.

The BEM keeps a table that maps site-id into the following fields:
1. Number of requests.
2. Bytes counter.
3. Number of requests waiting for resources.

The Detailed Statistics Collector (DSC).

The LM is further comprised of the DSC. The DSC consists of $3^{rd}$ party software running on a separate machine connected to a switch port that mirrors a FEM. A single FEM is considered a reasonable representation of the distribution of requests within the VHA Site, as connections to the FEMs are random and each FEM handles numerous requests.

Internal Components

The following components are internal components of the VHA Site.

i. The Remote Traffic Controller (RTC).

The RTC is the browser request's entry point into the VHA Site. It acts as the front end of the VHA Site to the external world in that the browser sees the external IP address of the RTC.

The RTC distributes the load of incoming requests by forwarding the request to the correct internal component target for further processing. As depicted in FIG. 1, flow of movement 5 and 1, SSL requests are directed to a SSLA and other valid request are forwarded to a FEM.

The RTC use a simple round-robin algorithm for forwarding requests to a suitable FEM. However, as the RTC receives from the LM information on the health and status of the various FEMs, frames are not forwarded to an overloaded FEM.

The RTC is a one-way mediator between the browser and the VHA Site. Requests from browsers are sent via the RTC to FEMs, however the reply comes directly from the FEM and bypasses the RTC.

The RTC uses two fast Ethernet interfaces. As the current communication speed of a fast Ethernet interface card limits the number of typical HTTP requests to about 13,000, the additional card improves performance. For enhanced VHA site performance it is possible to install multiple RTCs.

The RTC maintains at least two L2L Engines tables.

The first is a session table that maps usage count and session-ID into FEM-ID. This session comprises a concatenation of source IP address and source port and the ID of the destination FEM. The session is provided an initial value of 60 seconds which increments with usage. The aging task periodically decrements the usage count. When usage count drops to 0 the entry is freed and a "close connection" command is sent to the FEM.

The second L2L Engine table is a black list of session-IDs that are ignored. Typical TTL of blacklisted entries is 5 minutes.

RTC entries are deleted from the database based on aging or on request from the FEM.

The RTC is a critical unit. Therefore, for redundancy purposes, it is typically synchronized in real time with another RTC. Synchronization is achieved by means of a switch-port mirror feature that forwards RTC traffic to the redundant RTC.

The RTCs and the FEMs all share an external IP addresses. However the FEM is configured not to reply to ARP requests on the external addresses. For security purposes the RTC responds to the following incoming frame categories only:

1. TCP frames that have a valid external source/destination originating IP and a destination port 80, port 443 or port 21. Port 80 is the standard port for HTTP, the protocol used for transferring Web pages over the Internet. Port 443 is the default port for Secure Hypertext Transport Protocol and Secure Socket Layer (HTTPS/SSL), which is the encrypted form of HTTP that normally runs over port 80. Port 443 is the default port used for credit card transactions with an e-commerce site. Port 21 is the standard port for FTP.

2. TCP frames with an internal source/destination IP and source/destination port 10000. Port 10000 is reserved for communication with the redundant RTC.

3. UDP (User Datagram Protocol) frame with internal source and destination ports that are reserved for internal network messages. These include port 10000 that is used for the backdoor, port 10001 that is for management polling, port 10002 that is used for unsolicited messages and port 10003 that is used for message exchange with FEMs.

4. All other frames are rejected.

Passive FTP and SSL requests are forwarded by the RTC to their respective servers.

The LM assigns the RTC its external addresses and default gateway details. The RTC is assigned an internal address from within the network 192.168.1.0.

ii. The Front End Machine (FEM)

A central function of the FEM is to determine if the HTML requests it receives are recyclable, to forward recyclable requests to a CRM and non-recyclable requests to a BEM, and to provide a reply to the requesting browser.

More detailed functions include:

1. The FEM parses incoming requests using the L2L Engine.

2. FEM calculates a CRC representing the request and ascertains the site ID number that internally represents the Web site being requested.

3. FEM maintains a database of all supported Web sites parameters. From this database it decides if the request is recyclable. The FEM also determines the time to live for the recyclable object.

4. For each supported Web site, the FEM keeps a separate table of TTLs for static objects and another for dynamic objects. The tables are based on the directories' partial path entries. The TTL is the entry found at the deepest level. If a path cannot be found for a dynamic object then the object is declared non-recyclable.

5. The FEM chooses to which CRM to forward recyclable requests by means of a simple algorithm: (Concatenate site-ID and request CRC) modulo number of (FEMs-1). The FEM sends non-recyclable requests to a BEM according to a pre-defined table based on destination Web sites. This system, according to the present invention, considers both static and dynamic objects as recyclable. For purposes of the VHA System the only difference between static and dynamic objects is a static object has a longer TTL. (The TTL process is described in more detail in the following section that deals with the CRM on page 35). In principle an object is defined as non-recyclable only if two similar requests are able to return two non-identical replies, or if the operators at a WEB Site flag the data as non-recyclable.

6. The FEM is responsible for forwarding the reply that arrives from recycled data or from the WEB Site to the requesting browser.

Figure 3:
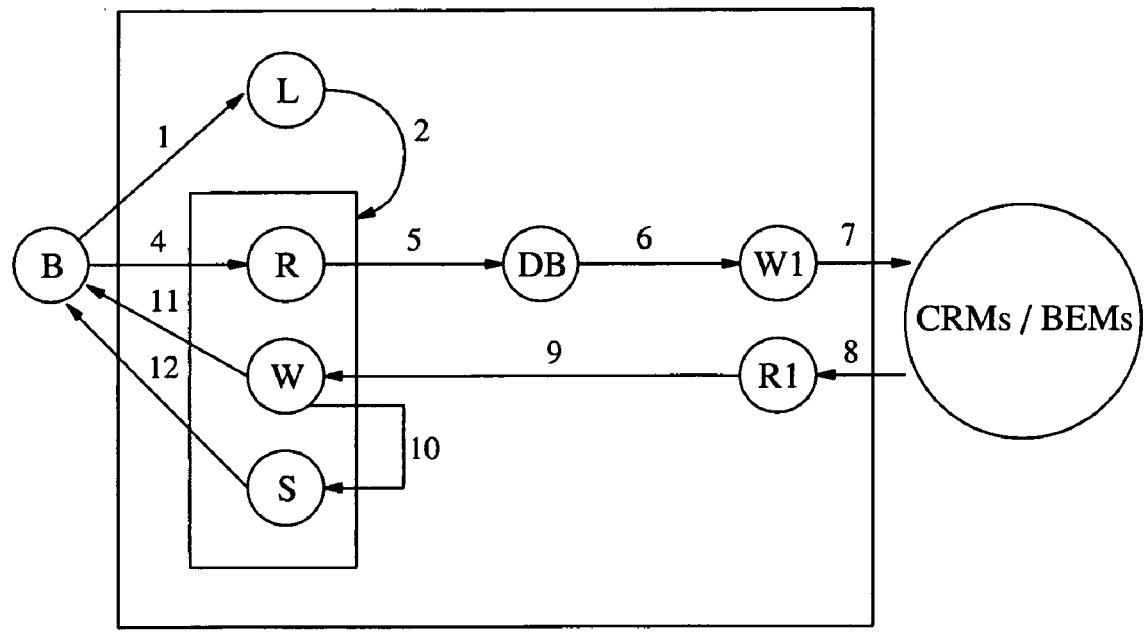
FIG. 3 is an illustration of FEM data flow.

FIG. 3 illustrates the operation of the FEM on receiving an HTTP request.

a. Listener (L) listens to port 80, accepts connections (1) and notifies userRead task (R) to handle the incoming request on the new port (2). The choice of (R) is based on a round-robin method to ensure a balanced load.

b. The userRead tasks (R) are responsible for accepting users requests (4) and forwarding them (5) to the database task (DB). In normal circumstances a poll function does not return ready socket numbers. Therefore the userRead task waits for incoming frames by running a modified poll function that probes all sockets to determine if they are ready and then returns a vector of all the ready sockets. R loops on the ready sockets, stores incoming requests in central memory buffer, updates headers and inserts pointers to new entries in the DB task queue.

c. DB task sends the request to the L2L Engine and waits for a reply.

d. A L2L Engine application parses the HTTP header to ascertain details including site-ID, TTL and responsible BEM. The application also calculates a URL path 8 bytes CRC. Further, based on Web site configuration, the FEM decides if the request is recyclable.

e. The DB task forwards (6) the request to outWrite task (WI).

f. Based on the reply from the L2L Engine the outWrite task (WI) sends (7) the request to a CRM or BEM.

g. The inRead task (RI) accepts replies (8) from BEMs/CRMs and notifies userWrite task (W).

h. The userWrite task (W) sends (11) replies to user until the socket blocks. The socket generally blocks because a typical browser's connection to the Internet is much slower than the VHA site connection. In such a case it notifies (10) userSlow task (S) to handle the job.

i. The userSlow task (S) uses temporary storage for buffering. It sends (12) portions of the response whenever a socket is ready for writing.

The FEM L2L Engine includes the following 3 Database tables:

CRC(host)→(siteID, BEM). This table updates online, meaning that the LM sends add/delete/modify requests to individual entries.

siteID+staticPartialPathCRC→TTL siteID+dynamicPartialPathCRC→TTL

To correlate request with replies and for statistical purposes, the FEM maintains a table with an entry for every (theoretical) socket number.

HTTP 1.1 allows client to send multiple requests on a single socket. Requests are relied to sequentially. Therefore, the FEM necessarily to keeps track of open requests and blocks the sending of additional requests on the same socket until previous requests are fully replied to.

As the TCP protocol is byte stream oriented, the FEM can also handle fragmented and multiple requests in single frames.

Concerning the forwarding of recyclable requests to a relevant CRM, the FEM performs the following calculation:

Let N be the number of FEMs in the VHA site.

If the request is recyclable FEM forwards it to CRM=[CRC (path) XOR site-ID] modulo (N−1), resulting in optimal load balancing among CRMs.

iii. The Content Recycling Machine (CRM)

The CRM is responsible for recycling and for providing recycled replies.

The CRM is a temporary storage area for frequent and recent data that that has been previously used. The CRM replicates data from the WEB Site and stores the data on the CRM in a way that facilitates quicker further access, using fewer resources than would be required to fetch the data again from the original source.

Each CRM is responsible for the recycling of data from a subset of served WEB Sites. The intersection of these subsets is null. In other words, each individual CRM stores and recycles objects from all of the serviced Web sites However the forwarding algorithm of the FEM to the CRM ensures that no single object can be stored on two CRMs.

The CRM utilizes a L2L Engine for its database storage and retrieval. The L2L Engine typically allows up to 2,000,000 objects to be simultaneously stored and speedily accessed.

Frequently used data (as defined with regard to TTL and weight—see page 39) is stored in RAM. Lesser-used data is stored on hard disk. A Disk Access Enhancement Method (see 3.Disk Access Enhancement Method. page 52) is used to access recycled data on disk.

Rather than address data by file name, the CRM, in conjunction with the L2L Engine, uses 1-node, (Logical Node) addressing to improve performance. The 1-node is a method that uses a pointer to address a file on hard disk or memory.

In one embodiment of the invention the BEM functions as a storage place for CRM data overflow. The CRM is designed to store millions of objects. Even though the CRM at present uses large 75 Gb disks, in some cases there may not be sufficient disk space to store such a multitude of objects. As the BEM does not utilize much disk space, any overflow CRM data is easily stored on the free space of the BEM's disk. To determine if the data requested resides locally or on a BEM, the CRM performs the following operation. The CRM database maps objects into 1-nodes. To indicate that a file resides locally the most significant byte of 1-node number (4 bytes integer) is allocated the characters FF. To indicate that a file resides on a BEM the most significant byte of 1-node number is allocated the BEM number. To determine which BEM is the extension for a specific object, the CRM calculates the CRC modulo number-of-BEMs.

The BEM runs a modified version of the CRM software (BEM-CRM). The software accesses the BEM database to set/find/delete the mapping of CRM+1-node into local 1-node number.

The CRM sends to the BEM-CRM various messages, including:
1. Process new file.
2. Process existing file.
3. Delete from database.
4. Report status.

The BEM-CRM replies to the CRM with various messages including:
1. Acknowledge/deny request.
2. Out of disk space.
3. Out of 1-nodes.
4. Change pending to stored.

Figure 4:
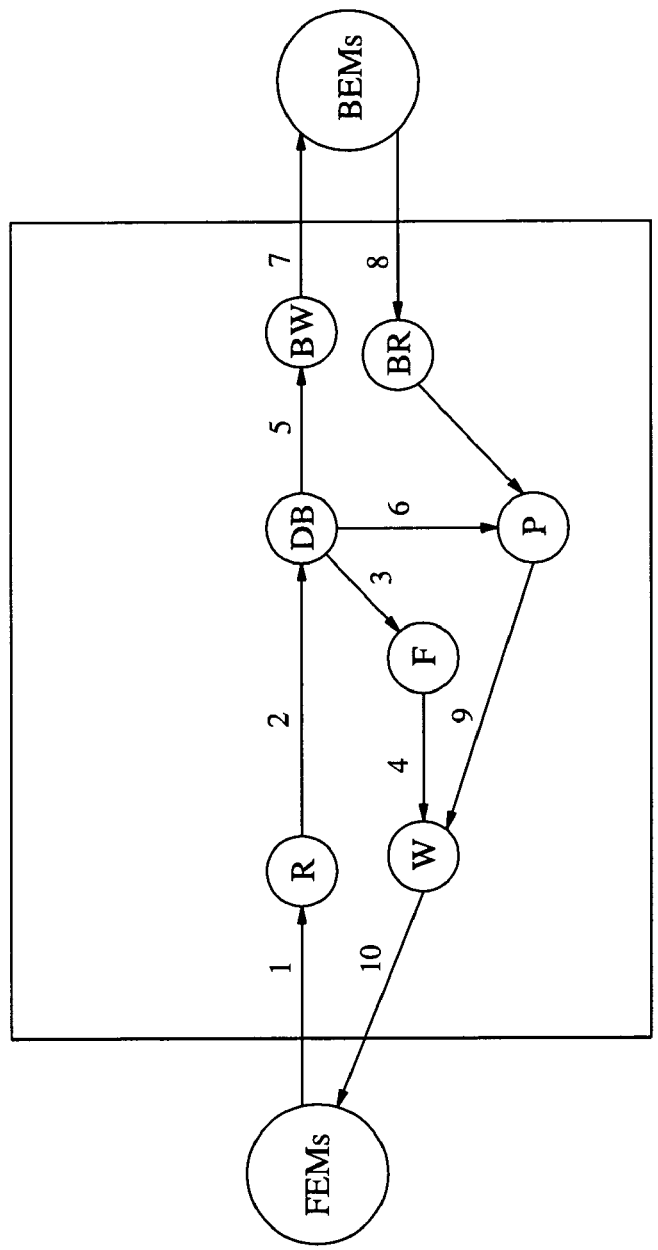
FIG. 4 is an illustration of CRM data flow.

FIG. 4 illustrates the CRM data flow.
1. femRead task (R) listens to requests from FEMs. Each received request (1) is sent to DB task.
2. DB task (DB) interfaces with the L2L Engine in the following manner:
   a. Accepts requests CRC (as calculated by the FEM), sends them to the L2L Engine and then waits for a reply. If a mapping exists, the DB task (DB) notifies (3) the fileWrite task (F). Otherwise the (DB) notifies (6) the pending task (P) and forwards the request to the bemWrite task (BW).
   b. Accepts requests to change "pending" to "stored" and forwards them to the L2L Engine.
   c. As required by the aging process, it periodically sends a clock signal to the L2L Engine to notify it that full cycle of time has passed.
   d. When aging removes entries whose TTL has expired, the L2L Engine sends a truncate command to set the file size to 0 (zero). The DB accepts and performs the task.
3. The L2L Engine application responds to DB task requests and periodically (using idle time) performs aging task.
4. The bemWrite (BW) task sends requests (7) to BEM.
5. The bemRead (BR) task receives (8) a reply from the BEM.
6. The pending tasks (P) are responsible for sending (9) to the bemWrite task (W) replies in process i.e. those that contain partially recyclable data).
7. The femWrite (W) task is responsible for sending (10) replies to the FEM.

CRM Database tables include:
Main table: site-ID+CRC(object)→CPU auxiliary memory table.
Pending table.

CPU auxiliary memory refers to the memory on the processor of the L2L Engine. In a typical L2L Engine the DRAM entries placement is dynamic which renders sequential access to information cumbersome. In order to overcome this problem a table is maintained on auxiliary memory that allows sequential access to the database entry. The auxiliary memory table is a reverse mapping of the main table.

The table stores TTL, current TTL, Weight and other information. The auxiliary memory table also retains a 64-bit bitmap of all 1-nodes (each 8 bytes entry represents 64 1-nodes) and a list of pointers to entries that include free 1-nodes.

TTL

An important element of the CRM is the TTL (Time To Live) and refresh innovation. TTL is defined as the set maximum amount of time an object is allowed to reside in the CRM before it is discarded.

An essential factor is that both static and dynamic objects can be recycled. The only objects that are not considered recyclable are where two similar requests could result with different replies. WEB Site managers are provided with two tables, one for static objects and one for dynamic objects, wherein they can define the object's recyclable status and manually allocate a TTL to objects.

Parameters that influence the recycle status of an object include:
The content owner decision whether in principle a specific type of object (for example a file type) is recyclable. If the decision to the file type is negative, then all the following parameters are not applicable.
A decision whether request containing user input can be recyclable?
A decision whether request containing cookies can be recyclable?
A decision whether the object type is dynamic or static?
A decision whether the object is recyclable over a SSL session?
A decision whether information in the server reply relevant to recycle status of an object can override the above decisions?
The TTL for this type.
By definition requests that contains user input or cookies are dynamic.

The table below illustrates the first steps for making a decisions concerning the recyclable status of an object.

TABLE 1

Object Type TTL Configurations

| Object Type | Recycle | User Input | Cookies | Dynamic | SSL | Force | TTL |
|---|---|---|---|---|---|---|---|
| HTML | Yes | No | Yes | No | No | Yes | 100 |
| PL | Yes | Yes | Yes | Yes | Yes | No | 10 |
| ASP | No | | | | | | |

According to the table a Hyper Text Markup Language (HTML) object by default is configured:
recyclable,
if there is contrary user input then do not recycle,
can be recycled even if there are cookies, static,
do not recycle SSL traffic, and
TTL is 100 time units, however if the WEB Site responds with an expiration date then the TTL is modified accordingly.

A PERL (PL) object by default is configured:
recyclable,
recycle even if there is user input,
recycle even if there are cookies,
dynamic,
recycle even if SSL traffic,
ignore Web Site instructions not to recycle objects and concerning expiration date, and
TTL is 10 time units.

Active Server Pages (ASP) requests are configured by default as non-recyclable.

In the VHA System the difference between dynamic and static objects is that dynamic objects use a different TTL table with reverse logic. According to this reverse logic, dynamic data that has been defined with a TTL is recyclable, and all other dynamic data is non-recyclable. In addition, as dynamic data does not inherit TTL qualities, only data specifically defined with a TTL is recyclable.

An example follows of a static objects table:

TABLE 2

Static Object TTL Table

| Path | TTL |
| --- | --- |
| / | 20 |
| /htdocs | 8 |
| /htdocs/A/ | 12 |

An HTML (static) request calculation is performed as follows:

An HTML object /htdocs/A/a.html is requested. In Table 1: Object Type TTL Configurations it can be seen that a HTML object is recyclable, static, and has a TTL of 100. From Table 2: Static Object TTL is determined that all objects in folder A have a TTL of 12. The lesser of the two TTLs, which in this case is 12 time units, is utilized.

An additional example is a request dynamic object /htdocs/B/a.html. Folder B has not been manually defined with a default TTL. From Table 1: Object Type TTL Configurations, a HTML object is assigned a TTL of 100. The closest reference to this object in Table 2: Static Object TTL is folder /htdocs which has a TTL of 8. The TTL of object /htdocs/B/a.html is therefore set to 8.

The following is an example of determining a TTL for a dynamic object:

TABLE 3

Dynamic Object TTL Table

| Path | TTL |
| --- | --- |
| /cgi-bin/a | 7 |
| /cgi-bin/a/B | 12 |

A PL request calculation is performed as follows:

A PL object (PL is dynamic by default)/cgi-bin/a/B/p.pl is requested. In Table 1: Object Type TTL Configurations it is determined that the PL object is recyclable, is dynamic, and has a TTL of 10. In Table 3: Dynamic Object TTL Table it can be seen that the default TTL for objects in the requested folder is 12. The lesser of the two TTLs, which in this case is 10 time units, is utilized.

An additional example is a request for dynamic object /cgi-bin/a/C/p.pl. Folder C has not been manually defined with a default TTL. Even though in Table 1: Object Type TTL Configurations a PL object is assigned a TTL of 10, as there is no direct reference in Table 3: Dynamic Object TTL Table to this folder or object, the object is defined as non-recyclable.

The TTL field can be defined in terms of seconds or by schedule. For objects that change frequently the TTL is generally defined in seconds. TTL fields defined by schedule can be refreshed in one of two methods:

The TTL field can be defined in terms of seconds or by schedule. For objects that change frequently the TTL is generally defined in seconds. TTL fields defined by schedule can be refreshed in one of two methods:

1. After the elapse of a specified amount time, defined in minutes, hours or days.
2. At specified calendar intervals.

The HTTP protocol does support TTL information by default. In cases where useful TTL information is provided, the site manager is able to over-ride the above method and use default HTTP TTL.

Aging is determined according to a table that takes the size of the file into account. The cost of fetching a file grows according to its size. In order to minimize this cost a table is defined whereby the larger a file, the larger its initial weight and its weight increment. The following table, Table 4: TTL Weight Increment, is an example demonstrating possible object size and corresponding initial weight and weight increment.

TABLE 4

TTL Weight Increment

| Object Size in Kb | Initial Weight | Weight Increment |
| --- | --- | --- |
| 0 to 10 | 10 | 1 |
| 10 to 30 | 20 | 2 |
| 30 to 100 | 30 | 4 |
| 100 or more | 40 | 8 |

Every time the object is used its weight (which is an indication of the object's importance) is incremented by its weight increment. However, if the object is not used over a set aging period its TTL and its weight is decremented by 1 (one). When TTL=0 the object is removed from the CRM. However, in cases where the object's TTL=0 and the weight is still high, if there are sufficient free 1-nodes the CRM requests the BEM to refresh the object. Similarly, an object can have a negative weight and a positive TTL. In instances that the number of free 1-nodes drops below 90% then objects with a negative weight are deleted from the CRM.

Another procedure occurs when the number of free entries drops below a specified limit. In this case emergency aging removes entries that are not yet aged but are defined as "cheap" to fetch.

iv. The Back End Machine (BEM)

The BEM receives requests for data that is not contained in the CRM. The BEM accesses the WEB Site for replies to these requests.

The BEM functions as follows:

The BEM listens to FEMs and CRMs for requests. The requests are written to a queue, which are sent as HTTP requests to the WEB Site. Each WEB Site has a set maximum number of opened sockets to the VHA Site. The sockets are permanent connections that can only be closed by the WEB Site. If the maximum number of opened sockets is in use then the request must wait for a socket to be freed. As there is a fixed amount of open sockets, the served WEB Site does not have to cope with unpredictable varying amounts of temporary sockets that cause peaks and slumps in performance and response.

A request is defined as a webWrite task. The answer from the WEB Site is defined as a webRead task. The webWrite and webRead tasks are paired and sent to the database task (dbTask). The dbTask has several functions including:

1. In certain circumstances the dbTask changes the TTL.
2. The dbTask is responsible for mapping shared disk requests (as described previously on page 36 that the CRM uses BEM disk space).
3. The dbTask serves as a coordinator for allocating sockets array for read/write tasks.
4. The dbTask sends the WEB Site response HTTP header to the L2L Engine for analysis.

Even though the dbTask allocates the sockets array (as stated above), the L2L Engine manages the sockets.

Figure 2:
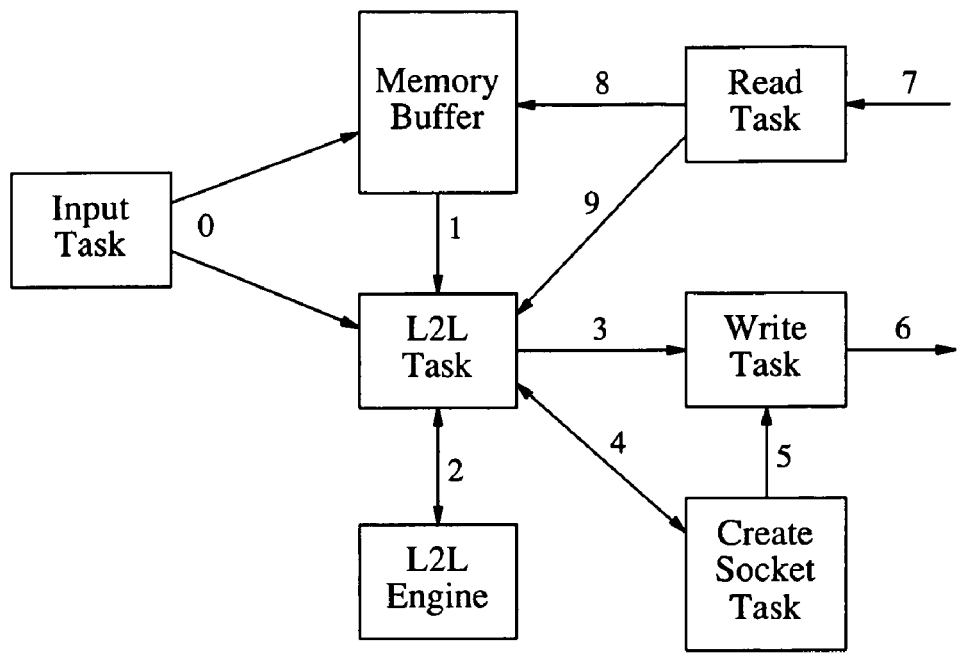
FIG. 2 is an illustration of BEM socket Management

FIG. 2 illustrates BEM Socket Management.

The Input task accepts requests from the CRM/FEM and notifies the L2L Engine task (0). The L2L Engine task sends to the L2L Engine a request (2) for a socket and waits for a reply. If a free socket exists then the L2L Engine task notifies the write task (3) and the L2L Engine task notifies (4) the create socket task. The create socket task creates a new socket, notifies (4) the L2L Engine task and notifies (5) the write task. The L2L Engine task then updates the L2L Engine. If the maximum socket limit has been exceeded, then a new socket cannot be created and all requests to the WEB site are blocked until a socket is freed. When a free socket is available the write task sends (6) the request to the WEB site. The read task accepts (7) a response from the WEB site and each response is stored (8) in the memory buffer. When a full response is received the read task notifies the (9) L2L Engine task to update the L2L Engine tables.

The following are examples of tables managed on MIPS memory. The FD is file descriptor or a logical structure required to access file and communication sockets.

FD (0-64K) table:
Type (free, busy, not-used)
Forward pointer to site free sockets
Backward pointer to site free sockets
Forward pointer to site busy sockets
Backward pointer to site busy sockets
Mapping of site ID into:
Number of IP addresses
Number of last used IP address
Task
Forward pointer to site free FD chain
Backward pointer to site free FD chain
Forward pointer to site busy FD chain
Backward pointer to site busy FD chain
Maximal number of sockets
Current number of sockets
Requests counter
Sockets indicator
Forward pointer to waiting list
Backward pointer to waiting list
Waiting table:
(FD, task)=getFree(site ID)
void updateFin(FD)
void updateCreate(FD, task, site)
void updateFree(FD)

v. The Secure Sockets Layer Accelerator (SSLA).

The SSLA is responsible for accelerating SSL sessions. SSL, an acronym for Secure Sockets Layer, was originally developed by Netscape to improve the safety of Internet communications. SSL is a protocol for transmitting private documents over the Internet by means of encrypted client/server communication between network devices. An encrypted SSL connection requires all information sent between a client and a server to be encrypted by the sending software and decrypted by the receiving software, thus providing a high degree of confidentiality.

SSL is primarily used to obtain confidential user information, such as credit card numbers. The URL of Web pages that use an SSL connection begin with https (instead of http).

The encrypted SSL request does not reveal the required destination host name and URL path. Thus the VHA Site cannot handle SSL requests in the same manner as standard HTTP requests. For that reason transparent forwarding of SSL is not supported. SSL support is provided as acceleration service only.

In SSL session establishment the client requires the server to return a site-specific certificate. As the SSL session is diverted to the VHA Site and at the initial stage of processing the VHA does not yet know the intended destination, the certificate does not contain the correct certificate signature. One solution is to change HTTPS links at served standard HTTP requests. For that reason transparent forwarding of SSL is not supported. SSL support is provided as acceleration service only.

In SSL session establishment the client requires the server to return a site specific certificate. As the SSL session is diverted to the VHA Site and at the initial stage of processing the VHA does not yet know the intended destination, the certificate does not contain the correct certificate signature. One solution is to change HTTPS links at served sites to a VHA SSL specific domain server, for example, to www.magnifireSSL.com. On HTTP pages the changes can be effected automatically, however for other requests such as JAVA, Java scripts, manual changes are required.

A SSLA machine requires require tremendous processing power to perform two main functions: opening sessions and encrypting/decrypting sessions. In addition to the typical hardware of each unit, which includes 2 Fast Ethernet interfaces and a L2L Engine, the SSLA also utilizes at least one $3^{rd}$ party SSL Accelerator PCI Card. Such a SSL Accelerator PCI card performs all encryption and decryption functions, and leaves the SSLA unhampered to perform its other functions.

Depending on subscribing WEB Site preferences, the SSLA can operate in one of two modes: the VPN mode and the Sessions mode.

VPN Mode.

In the VPN mode the SSLA both opens sessions to the destination WEB Site and relieves the destination WEB Site of the tasks of decrypting and encrypting.

Referring to FIG. 1, all SSL sessions are redirected by the RTC to the SSLA (5). The SSLA opens a secured session with the client. The SSLA decrypts incoming secure HTTP requests and parses them i.e. determines the real destination and what is the actual request. WEB Site operators ratify certain objects on secured session, for example non-sensitive information and images, as data that do not require secure processing. These objects are flagged for storage in the CRM. Requests for these objects are sent to the CRM for normal non-secure accelerated processing (9 and 10). Even though at this stage the request is not encrypted, it never the less does carry a flag to indicate that it is a secure session request. The SSLA then sends the session to the internal VPN. The internal VPN uses third party VPN hardware to encapsulate the session based on IPSec (IP Security Protocol). The internal VPN forwards the secured session (7) to the external VPN. The external VPN is an internal component of the target WEB Site. Once the session is safely inside the confines of the target WEB Site the VPN removes the VPN encapsulation and relays the request (8) internally in an unsecured mode. Once the answer to the request is received the external VPN encapsulates the session again and returns the response to the internal VPN. The internal VPN removes encapsulation and forwards the session to the SSLA. The SSLA provides a security-encrypted response to the browser.

Sessions Mode

The Sessions mode recognizes that there is a latent security problem in the previous VPN mode. Even though confidential requests reach the target WEB Site in a highly secured manner, once inside the destination site the requests are unsecured and exposed. On many WEB Sites, such as banks, exposing confidential requests before they reach their focal point of destination is unacceptable.

Of the two SSLA functions, opening sessions and encrypting/decrypting, SSL session establishment is by far the heaviest exhauster of resources. For the sake of security the Sessions mode opens permanent SSL sessions to the destination WEB Site and relinquishes on the encrypting/decrypting function. The request arrives at the destination in an encrypted form. The destination WEB Site performs the lesser processing tasks of accepting opened sessions from the SSLA and of encryption/decryption.

A detailed data flow description of the Sessions mode follows:

a. Establish SSL session with client.
b. Receive request.
c. Decode request (clients keys).
d. Locate free SSL session to origin server.
e. Encode request (server keys).
f. Forward request to destination.
g. Get reply.
h. Decode reply (server keys).
i. Encode reply (clients keys).
j. Send reply to client.

vi. The internal VPN.

As has been described above the internal VPN is sometimes used by the SSLA to transport data from the VHA Site to a WEB Site in a secured mode.

vii. The Detailed Statistics Collector (DSC).

The DSC runs $3^{rd}$ party software for collecting statistics.

Additional Features and Processes According to the Present Invention:

1. The L2L Engine

Nearly all of the VHA System units incorporate at least one L2L Engine.

The L2L Engine is a fast hardware system used to vastly enhance database capability and accelerate database searches. In the present invention objects in computer memory are also considered a database. The L2L Engine is essential in expediting searches and retrievals from memory and disk.

The L2L Engine could be a PCI interface card containing fast hardware and methods for accessing databases. A possible L2L Engine is an e.Card™ Lite (Aeroflex UTMC, 4350 Centennial Blvd. Colorado Springs, Colo. 80907, 800-645-UTMC).

2. Logical-Node Addressing

The Logical Node (1-node) is a pointer used to address data on RAM and on hard disk. L-node references to data contain the following elements:

a. disk on which data is stored
b. file name
c. file offset
d. size.

From the offset and the file size the address of the end of the data is known.

As the exact address of data is controlled and known, the data can be accessed in a sequential fashion that does not cause random disk head seek movement.

An IP Packet typically contains the following fields:

| Ethernet Header | IP Header | IP CRC | TCP Header | TCP CRC | Data | Ethernet CRC |
|---|---|---|---|---|---|---|

The intra-site protocol packet only uses the following four fields:

| Ethernet Header | TCP Header | Data | Ethernet CRC |
|---|---|---|---|

Addressing is based on the unit's Level 2 MAC (Media Access Control) address.

Even though the above proprietary intra-site protocol is recommended, the VHA Site can still run adequately on the standard TCP/IP protocol.

3. Disk Access Enhancement Method.

Frequently used files for recycling are stored in RAM and lesser-used files on disk. Current access to files on disk presents a bottleneck as typical disk access time takes an average of 8.5 ms. Therefore, an enhanced method of disk access is proposed, whereby each physical disk contains files of fixed size termed "global" files wherein are stored sub-files. For example, if global file size is set to 2 Gb each, then a 75 Gb hard disk would contain about thirty-seven sets of 2 Gb global files. Sub-files are stored within global files according to size criteria, so that small files are stored together in separate global files and large files are stored together in other separate global files. Possible ranges of sub-file sizes are displayed in Table 5: File Size/Amount Ratio below. The amount of sub-files stored on a file naturally depends on the size of the sub-files, such that more small sub-files are stored together than large sub-files.

each physical disk contains files of fixed size termed "global" files wherein are stored sub-files. For example, if global file size is set to 2 Gb each, then a 75 Gb hard disk would contain about thirty seven (37) sets of 2 Gb global files. Sub-files are stored within global files according to size criteria, so that small files are stored together in separate global files and large files are stored together in other separate global files. Possible ranges of sub-file sizes are displayed in Table 5: File Size/Amount Ratio below. The amount of sub-files stored on a file naturally depends on the size of the sub-files, such that more small sub-files are stored together than large sub-files.

TABLE 5

| | File Size/Amount Ratio | |
|---|---|---|
| Type | Sub-file Size (KB) | Number of Sub-files (thousands). |
| Tiny | 2 | 1000 |
| Small | 5 | 400 |
| Normal | 10 | 200 |
| Large I | 50 | 40 |
| Large II | 100 | 20 |
| Very Large | 200 | 10 |
| Huge | 1000 | 2 |

As the global files are un-fragmented, order is maintained and disk space usage is maximized. Sub-files are addressed within the global files by 1-node in such a way that the L2L Engine is aware of and controls where each sub-file physically starts and ends. In order to access a sub-file, the global file is accessed and the L2L Engine can pinpoint a known entity at a specific address.

Batches of requests for data on a disk are queued and organized so that data is retrieved sequentially according to its 1-node position on the disk. As file access is not random, disk head movement is stabilized, seek time is limited and data location is enhanced.

On a 75 Gb disk the OS only sees about 37 files. However, due to this method, the VHA System is able to access millions of files concurrently.

Figure 23:
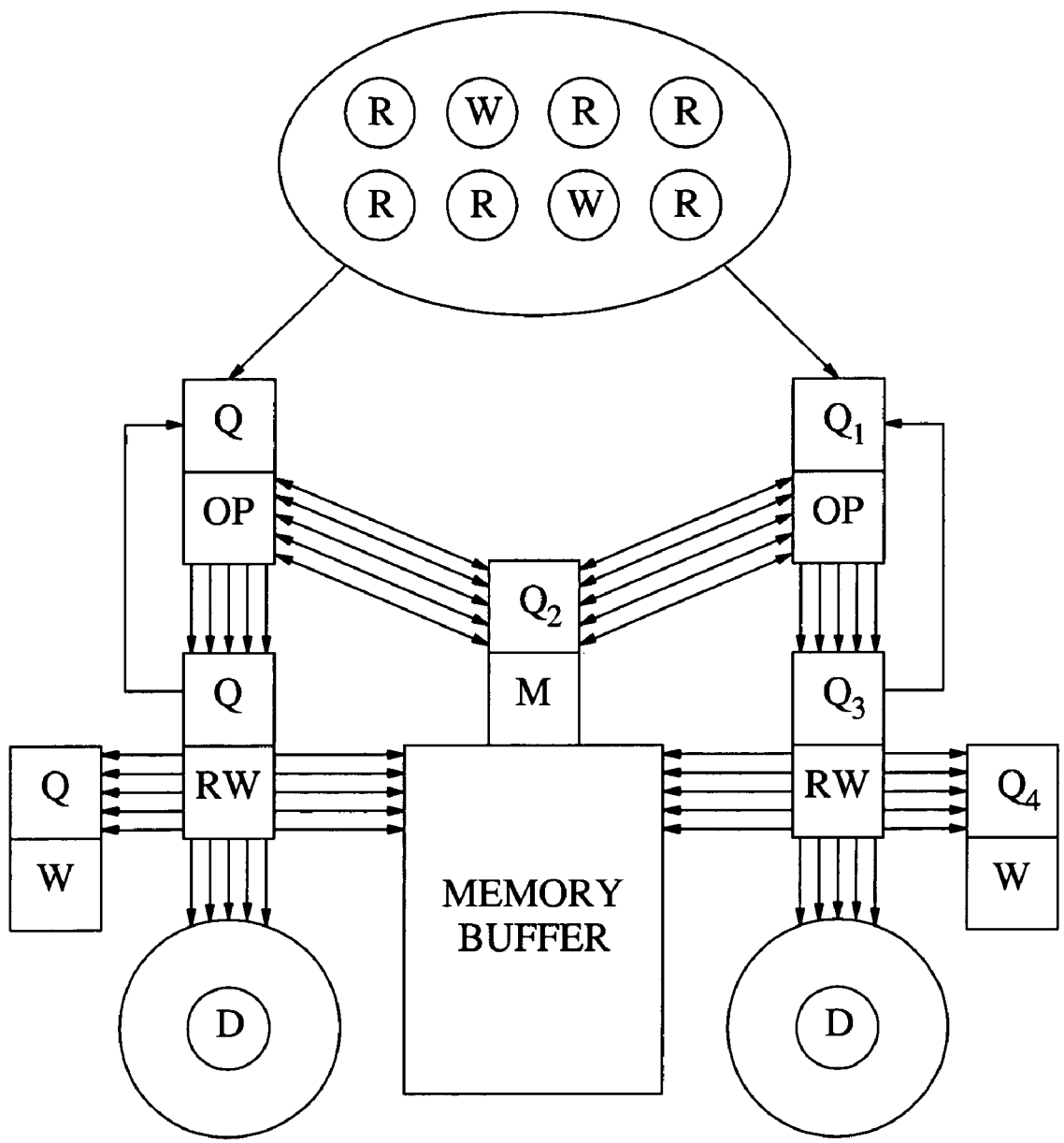
FIG. 23 is an illustration of the Enhanced Disk Access Process.

Operational details whereby Read and Write tasks are processed follow with reference to FIG. 23.

The L2L Engine determines the 1-node of the requested data (R), and accordingly sends the requests to a queue (Q1) for the disk where the data resides. The 1-node notes that it requires a specific amount of buffer units to keep the task data in the memory buffer, and provides pointers for this memory. The requests are analyzed by optimization threads (one for each disk), which use reverse queuing (last in first out). This Optimization Process (OP) furthermore determines, based on the quantity of requests, whether there is enough buffer space available for the RW data (threads). When RW threads realize that it has only one (or maybe two) requests left, it notifies the "optimization" thread by adding a message to a queue. In this case, the "optimization" thread closes, "batch" performs an optimization calculation and put all requests into a buffer according to required disk access order. For each request RW thread puts the file chunk into the central buffer memory allocated for it by the "optimization" thread and it notifies a "server write" thread by sending message to its queue (Q2). The logical pointer requests are subsequently sent to a database engine, where the logical node puts the requests into an appropriate or correct queue for processing, according to where data is found on the disk. The request for the 1-node is sent to Q3 where it is gathered in a batch of requests for the same disk. Requests are then sorted sequentially according to the position of the data on disk so that the disk head will be able to read data in a smooth sequential flow rather than jump all over the disk randomly searching data.

Once data is retrieved from the disk it is written (RW) to the Memory Buffer from where it is sent to Q4, and subsequently to the client requester.

In case of a write task (W) a similar algorithm is used. The optimization thread (OP) notifies RW with a list of pointers to buffer memory. For each completed write, RW returns the buffer to central buffer memory, before being sent to a client. In order to ensure that data is always current, write tasks always precede read tasks.

Objects categories are defined by their access rate, most frequent (stored on RAM disk) and normal (very large files are always normal). To provide means of decision the Weight field is split into current cycle and aggregated portions. Initially an object is stored as normal. On aging if current Weight is high enough, refreshed objects are stored on a preferred partition or on RAM disk.

4. Request Priorities.

A system prioritization of requests is enabled whereby preferred requests are put on priority queues. Priority queues have absolute preference, meaning that normal requests are handled only when priority queues are empty.

Request priority is based on URL, user or both. For example, users accessing specific pages, or clients from certain sites, or frequent users can be given priority.

Request prioritization works on all levels of the VHA System. A request with a high priority is processed with preference from the FEM to the CRM to the WEB Site and back again to the client.

5. The Backdoor Task

The function of authorized backdoor access is to manage and control internal VHA Site units. As a typical unit does not have valid address, it cannot be accessed from outside of the system. The LM is designated to control and regulate backdoor access to the VHA Site.

A backdoor is defined as an unorthodox method of authorized access to the system for administration purposes, including configuration and rebooting. A backdoor is necessarily accompanied by high security as it often provides an unknown vulnerability that could be used to permit illegal access to the system.

The backdoor is implemented over TCP or UDP (User Datagram Protocol) to a socket on the LM. Access requires session establishment. Backdoor sessions have a limited lifetime, which at present is approximately 5 minutes. On expiration the backdoor server discards requests. Messages are authenticated using a MD5 hashing function. Session requests include a random dummy user name that is not used by MD5. The server checks the list of registered and authorized managers for the requesting source IP address and port. On identification the server responds with a random number and the client attaches an electronic signature using this random number, the computer's IP address as a user name and the port number as a password. The VHA System is limited to a range of 10 valid ports or passwords. Any request violating this scheme is rejected.

Backdoor requests begin with a one-byte request type. 0 (zero) stands for a standard system request, which the server responds to. Any other value stands for a specific VHA System command.

6. VHA Site Initialization and Unit ID

An Eth0 MAC address uniquely identifies each VHA unit (static ID) and serves as an external label. Additionally every VHA unit at each specific VHA site is dynamically identified by a unique one byte ID. All intra-site frames include source and destination unit IDs. Each VHA unit keeps a table, consisting of up to 255 entries, of all site units with the following information:

Unit ID.

Unit internal IP address. (Not used when the intra-site protocol is implemented.)

Unit MAC address.

Unit type (L=RTC, M=LM, F=FEM, C=CRM, B=BEM).

Status (Good, Bad or Dead).

Unit addresses start with a single internal IP address of the network 192.168.1. The Protocol is a unit-ID with no-ARP option. One unit is exclusively defined as the Primary Local Manager (PLM). The PLM is the only unit to start up with an external IP address and internal IP address with ARP enabled. The PLM broadcasts for a specified time to indicate that it is alive.

When each unit initializes it periodically broadcasts a UDP request for identification and for the designation of a unique static ID. The request continues until the LM responds with the required data. Additionally the LM verifies the uniqueness of the unit ID.

After the identification verification process, each unit broadcasts the LM with a type request. The LM responds with an allocated type (RTC, FEM, CM, BEM) and additional required information, such as an external address. All PLM messages contain a flag that indicates they originate from the Primary Manager.

As the LM distributes and duplicates the same site table to every individual unit, each unit maintains an identical table of all site units. The LM ensures that the units table is updated on all machines using UDP multicasts with individual acknowledges. Four commands are used:
send table
update status
add entry
remove entry As several LMs could be defined at one VHA Site, the PLM carries a marker in its broadcasts to inform units of its status.

If the PLM fails during normal work, and no other LM is defined, the BEM with the lowest unit ID takes on the role of temporary local manager (TLM). All messages from the TLM include a flag indicating that it a temporary local manager. When the TLM receives a PLM broadcast, in effect meaning that the PLM has been restored, the TLM backs off.

7. Unit Redundancy

Redundancy refers to units and devices that take on the processing or transmission load of other units when those units fail or performance is impaired. Redundancy is affected by several main factors:

I All system units are physically separate and identical. Therefore, every unit has the physical ability to perform the function of any other unit in the system. byte number. A calculation of the modulo number of CRMs results in the CRM identification. If a CRM fails, then, a using similar mechanism, requests originally destined to the failed or failing CRM are sent to a healthy CRM.

Provided is pseudo code whereby the FEM calculates a destination CRM:
Let N be the number of CRMs.
Let M be the number of active CRMs.
Let V be a mapping of M into valid entries in N.
calculateCRM {
if ((CRM=modulo(CRC(path), N-1)) is valid) return (CRM);
return(V(modulo(CRC(path), M-1)));
}

Accordingly, a CRM fault causes performance degradation but not a system failure.

Following is the manner of calculating a destination BEM:
The LM ensures that in a healthy system no two BEMs handle the same WEB Site. However, if a BEM fails, then destined requests are distributed among the remaining healthy BEMs.

Pseudo code of the process follows:
Let N be the number of BEMs.
Let M be the number of active BEMs.
Let V be a mapping of M into valid entries in N.
BEM destination is provided at initialization. However in case of a BEM fault, the FEM will choose an alternate BEM by calculating V(modulo(BEM, M-1)).

Accordingly, a CRM fault causes performance degradation but not a system failure.

Following is the manner of calculating a destination BEM:
The LM ensures that in a healthy system no two BEMs handle the same WEB Site. However, if a BEM fails, then destined requests are distributed among the remaining healthy BEMs.

Pseudo code of the process follows:
Let N be the number of BEMs.
Let M be the number of active BEMs.
Let V be a mapping of M into valid entries in N.
BEM destination is provided at initialization. However in case of a BEM fault, the FEM will choose an alternate BEM by calculating V(modulo(BEM, M-1)).

A FEM replaces a RTC or a LM in the case of a failure.

If a LM fails then a BEM with the lowest ID assumes the LM's role. If the site only operates one BEM, then the CRM with lowest ID takes on the LM's functions. If only one CRM is operational, then the FEM with lowest ID takes on the LM's functions. If only one FEM is operational, then the BEM notifies the VCC and the site continues to operate without a LM.

In all other cases of failure, the LM designates a substitute unit. The order of preference for substitutes is: BEM, CRM, FEM and finally RTC.

In addition, the VHA site performs a process of self-optimization. The LM regularly collects statistics from all units, analyses the data and if necessary designates tasks to other units to provide optimal performance.

As described previously, the RTC uses a round-robin algorithm for forwarding requests to a FEM. However, the RTC also receives from the LM information on the health and status of each FEM. Therefore, if a FEM is overloaded the RTC forwards the frame to an alternative FEM. A similar self-optimizing process applies from the FEM to CRM and CRM to BEM.

This process of self-healing, self-customization and self-optimization is termed Automatic Problem Resolution (APR). APR ensures that in the case of a unit failure or degradation of performance, another unit fully substitutes the functions of the failed or slack unit.

Method

The method of operation, according to the present invention, includes the following processes:

Numerous major WEB Sites, for example those hosted by Web Publishers, large companies, ISPs, hosting services and E-Commerce firms, subscribe to the VHA Site solution. The VHA sites act as a buffer between these WEB Sites and the millions of end-users connecting to them. The number of VHA Sites required varies with the amount of subscribing WEB Sites. The amount of redundant units in the VHA Sites varies according to the amount of traffic expected and experienced on the various subscribing WEB Sites. In effect, if a WEB Site experiences seasonal spikes or a permanent increase in traffic, it is incumbent on the VHA System, not the actual WEB Site, to provide additional and stronger hardware to cope with the additional load.

VHA Sites are strategically placed, geographically and on major Internet backbones. The VHA system ensures rapid client/host connectivity, accelerates data access and protects the host WEB Sites, by means of several innovative methods.

In order to illustrate the method of the present invention, the previously mentioned example of the resident of Kazakhstan who wishes to purchase a few books from an on line shop over 10,000 km away in U.S.A. is used.

The user enters the bookshop URL using the browser software. The request is forwarded, via modem, to the ISP's DNS. As the bookshop's WEB Site is a subscribing member of the VHA System its IP address is registered at DNSs world round as a VHA Site rather than the bookshop's actual IP. A multitude of RR machines is placed globally on the Internet backbone and in proximity to ISPs. The request is then forwarded to a conveniently close RR. The RR consults its "whois" database that was recently updated from, for example, Oregan University's database, and calculates from which vicinity the client request came. As Kazakhstan does not have a developed Internet backbone system, the RR forwards the request to the VHA Site in the closest geographical proximity. In the VHA System, most or all of the processing is executed at the VHA Site. Therefore, connecting to a physically close site improves performance.

As mentioned, the VHA Site, not the bookstore itself, is defined at the DNS as the registered IP address. As the RTC is the first unit in the VHA Site that receives the browser's HTTP request, if the client performs a "nslookup" to determine the target IP address, the address of the RTC is returned. Similarly, when the system responds to the browser's request, the response is from the VHA Site, not from the target bookstore site itself. This adds an extra level of security to the target site as the world external to the with a long TTL. The CRM utilizes a L2L hardware database engine for speedily retrieving pages and replies to the FEM. The FEM completes the session request by directly forwarding the page to the client via the client's ISP.

Within a split second the page containing the price of books appears neatly formatted in the client browser window.

The customer then chooses to purchase two books that appear on the price-list; a best seller and another obscure non-fiction. The customer marks those books on the browser-scripting page and sends the request to the bookstore. Once again, the DNS diverts the request to the nearest VHA Site. When the FEM receives the request it recognizes that even a dynamic page of the type requested could be recycled, and sends it to a CRM for processing. The CRM determines that the requesting process for the popular book actually resides in the CRM. However, even though the process for the non-fiction book is recyclable, because it either has never been accessed, or it has not been accessed for a lengthy period, subsequently causing its TTL to expire, it does not reside in recycled material. Even though it may be a very busy day for the bookstore site with thousands of books being requested at any minute from all over the world, the reply to the requisition for the book from the recycled page is immediately forwarded from the CRM to the FEM without even bothering the bookstore WEB Site. The FEM then stores the page because it recognizes a multi request session from a client ID. The CRM sends the request for the book that cannot be accessed from recycled material, to the BEM. The BEM then forwards the request to the actual IP of the bookstore WEB Site, which even though is hidden from the client, is available to the VHA Site. Once the bookstore processes the request it returns it to the BEM, which in turn sends the page to the CRM recognizes that even a dynamic page of the type requested could be recycled, and sends it to a CRM for processing. The CRM determines that the requesting process for the popular book actually resides in the CRM. However, even though the process for the non-fiction book is recyclable, because it either has never been accessed, or it has not been accessed for a lengthy period, subsequently causing its TTL to expire, it does not reside in recycled material. Even though it may be a very busy day for the bookstore site with thousands of books being requested at any minute from all over the world, the reply to the requisition for the book from the recycled page is immediately forwarded from the CRM to the FEM without even bothering the bookstore WEB Site. The FEM then stores the page because it recognizes a multi request session from a client ID. The CRM sends the request for the book that cannot be accessed from recycled material, to the BEM. The BEM then forwards the request to the actual IP of the bookstore WEB Site, which even though is hidden from the client, is available to the VHA Site. Once the bookstore processes the request it returns it to the BEM, which in turn sends the page to the CRM for recycling. The CRM forwards the page to the FEM that coordinates it with the first page of the same session. The FEM then sends confirmation of the order to the client browser.

The client browser receives a confirmation of the order on the screen. However the bookstore now requires some imperative information from the customer without which the order cannot be completed. Included in the confirmation page is a link to a page that requests the customer's personal information and credit card details. This information is private and sensitive and the page being completed is not of the regular HTTP type but is a HTTPS protocol page. The HTTPS page is transmitted over the Internet in an encrypted form via SSL. Once again the DNS sends the page to the RR, which forwards it to the RTC. As this is an HTTPS request, the RTC sends the page to the SSLA for processing. The powerful SSLA machine quickly opens a SSL session and decrypts the page. Certain aspects of the HTTPS request, including graphics and images, are available in recycled data and the SSLA obtains them from the CRM. However, due to HTTPS security limitations, the WEB Site itself must deal with the actual HTTPS request. The page in its currently decrypted state, with sensitive information, cannot be sent as it is over the Internet to the WEB Site. The sensitive data is therefore sent to a VPN machine within the VHA Site for VPN encryption. In encrypted state the packet is then sent to the WEB Site where a connected VPN machine, within the safe environs of the WEB Site's intra-net, decrypts the data. Once the WEB Site processes these details it responds to the client browser via the SSLA and confirms the order.

This method of processing Web data and the fast system hardware thereby ensure that requests are processed speedily and securely.

The foregoing description of the embodiments of the invention has been presented for the purposes of illustration and description. It is not intended to be exhaustive or to limit the invention to the precise form disclosed. It should be appreciated that many modifications and variations are possible in light of the above teaching. It is intended that the scope of the invention be limited not by this detailed description, but rather by the claims appended hereto.

What is claimed is:

1. An apparatus for processing requests to WEB Sites, comprising:

a Remote Traffic Controller (RTC) configured to direct secure and non-secure traffic;

at least one Front End Machine (FEM) in communication with the RTC, wherein each FEM is configured to direct a request, and wherein the directing is based on whether the request is for recyclable-content;

at least one Content Recycling Machine (CRM) in communication with the at least one FEM, wherein the at least one CRM is configured to provide a reply associated with the recyclable-content, and wherein the recyclable-content is indicated as recyclable based on:
  whether replies from a WEB Site match each other based on a match of HTTP header information of the replies from the WEB Site, wherein the replies from the WEB Site are returned for a plurality of requests; and
  whether the plurality of requests associated with the recyclable content match each other; and
at least one Backend Machine (BEM) in communication with the at least one CRM and the at least one FEM, wherein the at least one BEM is configured to access the WEB Sites with the request if the request is for non-recyclable content.

2. The apparatus of claim 1, further comprising a plurality of Request Routers (RR), such that each said RR is an authoritative domain name server for at least one registered Web site.

3. The apparatus of claim 1, further comprising a plurality of Secure Sockets Layer Accelerators (SSLA), wherein said RTC selects one of said SSLAs to process the request.

4. The apparatus of claim 3, further comprising a plurality of Virtual Private Network servers (VPN), wherein said SSLA selects one of said VPNs to process the request.

5. The apparatus of claim 1, further comprising:
  (a) A Detailed Statistics Collector (DSC);
  (b) A Virtual Host Accelerator (VHA) Control Center (VCC);
  (c) A VHA Management Station (VMS); and
  (d) A Local Manager (LM);
  wherein said elements (a), (b), (c) and (d) are utilized for management functions.

6. The apparatus of claim 1, further comprising a Layer Two Lookup (L2L) Engine.

7. The apparatus of claim 1, wherein the WEB Sites are subscriber sites.

8. An apparatus for processing a request over a network, comprising:
  means for determining whether the request is secured or non-secured;
  means for determining whether an object is recyclable based on whether a plurality of similar requests associated to the object return a plurality of identical HTTP header information in replies to the similar requests, wherein at least one of the replies is from a Web Site, and wherein the information in the replies is associated with parameters stored for the Web Site;
  means for providing a reply associated with the recyclable object; and
  means for accessing a source node reply associated with the request.

9. The apparatus of claim 8 further comprising:
  means for directing the request, wherein the directing is based on at least one of following:
  whether the request is for a recyclable object;
  whether the request is secured; or
  a proximity of the apparatus to a requestor.

10. A method for processing a request over a network, comprising:
  indicating that an object is a non-recyclable object, if a plurality of HTTP header information for replies are determined to be non-matching, wherein each of the replies is a response to each of a plurality of similar requests associated with the object, and wherein at least one of the replies is from a WEB Site;
  otherwise, indicating that the object is a recyclable object;
  if the processed request is for the recyclable object, providing the cached reply associated with the recyclable object, and
  otherwise, accessing a source node reply associated with the request.

11. The method of claim 10 wherein indicating that an object is recyclable is further based on at least one of a flag, a property, or a time to live associated with the plurality of similar requests.

12. The method of claim 10 further comprising: load balancing at least one of:
  a determination of whether the request is for the recyclable object;
  the providing of the cached reply associated with the recyclable object;
  the accessing of the source node reply associated with the request; or
  a caching of one of the replies.

13. The method of claim 12, wherein the load balancing of the caching of one of the replies, is based on a property of one of the similar requests.

14. The method of claim 10, further comprising:
  determining whether the request is secured or non-secured.

15. The method of claim 10, further comprising:
  performing secured acceleration on the request, if the request is secured.

16. The method of claim 10, wherein the cached reply is secured.

17. The method of claim 10, further comprising:
  terminating the request, if a threshold associated with the request is exceeded.

18. The method of claim 10 wherein the source node reply comprises a reply from at least one of a web site, a TCP source, or a UDP source.

19. A network device that is operative for processing a request over a network, comprising:
  a communications interface enabled to receive and send data;
  a memory component for storing data;
  a processing component in communication with the memory component and the communication interface, and configured to perform a plurality of actions, including:
    indicating that an object is a recyclable object based on whether a plurality of requests associated with the object are similar and whether the plurality of similar requests returns a plurality of identical HTTP header information in replies from a WEB Site, wherein the replies result from the similar requests;
    if the request is for the recyclable object, providing a cached reply associated with the recyclable object, and
    otherwise, accessing a source node reply associated with the request.

20. The network device of claim 19, wherein the similar requests includes similar host information associated with the requests.

21. The network device of claim 19, wherein indicating that an object is the recyclable object is further based on at least one parameter, wherein the at least one parameter includes at least one of whether the request includes a user input, whether the request includes a cookie, whether an object type associated with the object is dynamic, or whether the object is recyclable over a SSL session.

22. The network device of claim 21 wherein indicating that an object is the recyclable object is further based on whether information in the replies relevant to recycle status of the object overrides the at least one parameter.

23. The network device of claim 19, wherein the processing component enables further actions comprising load balancing at least one of:
- a determination of whether the request is for the recyclable object;
- the providing of the cached reply associated with the recyclable object;
- the accessing of the source node reply associated with the request; or
- a caching of one of the replies.

24. A method for processing a request over a network, comprising:
- indicating that an object is a recyclable object if a plurality of similar requests associated with the object are similar and the plurality of similar requests returns a plurality of identical HTTP information in replies, wherein at least one of the replies is from a WEB Site;
- if the request is for the recyclable object, providing a cached reply associated with the recyclable object, and otherwise, accessing a source node reply associated with the request.

25. A method for processing requests to subscriber WEB Sites comprising:
- intercepting a Domain Name Server (DNS) request to one of the subscriber WEB Sites, by a Request Router (RR) mechanism;
- redirecting said request to a Remote Traffic Controller (RTC) to further process said request;
- selecting a Front End Machine (FEM) to further process said request;
- if the request is associated with recyclable content, selecting a Content Recycling Machine (CRM) to further process said request, wherein the recyclable content is determined as recyclable based on whether replies match each other based on a match of HTTP header information of the replies, wherein at least one of the replies is from a WEB Site, and wherein the replies are returned for a plurality of requests; and
- whether the plurality of requests associated with the recyclable content match each other;
- otherwise, selecting a Backend Machine (BEM) to further process said request; and
- selecting said one of the subscriber WEB Sites to further process said request if said request is for non-recyclable content.

26. The method of claim 25, wherein said RTC is an entry point for said request.

27. The method of claim 25, wherein said redirecting of said requests is based on proximity to a client requestor.

28. The method of claim 27, wherein said proximity is defined in terms selected from the group consisting of geographical proximity and backbone proximity.

29. The method of claim 27, wherein said criteria of proximity is determined by mechanisms including:
  (a) a global WHOIS database wherein IP networks are mapped to geographic locations; and
  (b) a mappings database wherein IP networks are mapped to autonomous system numbers.

30. The method of claim 25, wherein said RTC further comprises the steps of:
  (a) accepting request sessions from said RR;
  (b) tracking said sessions;
  (c) determining whether said request is of a type selected from the group consisting of protocols HTTPS, HTTP and FTP;
  (d) forwarding said HTTPS request to a Secure Sockets Layer Accelerator (SSLA) for further processing; and
  (e) forwarding said request selected from the group consisting of HTTP and FTP to a plurality of FEMs for further processing.

31. The method of claim 30, wherein if protocol of said request is determined to be an alternative protocol to said HTTPS, HTTP and FTP, then said request is rejected.

32. The method of claim 25, wherein selecting of said FEM further comprises the steps of:
  (a) determining whether said request received from said RTC of claim 8 is of a type selected from the group consisting of recyclable and non-recyclable;
  (b) if defined as recyclable, forwarding said recyclable type request to a plurality of CRMs for further processing;
  (c) if defined as non-recyclable, forwarding said non-recyclable request to a plurality of BEMs for further processing;
  (d) receiving a response to said request from said CRM;
  (e) receiving a response to said request from said BEM; and
  (f) forwarding said response to said client requestor.

33. The method of claim 25, wherein said CRM further comprises the steps of:
  (a) maintaining a database of recyclable content;
  (b) determining if a response to said request of said FEM of claim 15 is available in recycled content;
  (c) forwarding said request that is not available in said recycled content to a plurality of BEMs for further processing;
  (d) receiving a response to said request from said BEM; and
  (e) providing a response to said request of said BEM.

34. The method of claim 25, wherein said BEM further receives a response from said WEB Site to said request.

35. The method of claim 33, wherein said BEM acts as a storage overflow for said recyclable content of said CRM.

36. The method of claim 25, wherein said requests to the subscriber WEB Sites are associated with a list of priorities, wherein said requests with a higher said priority are processed in a sequence of time prior to said requests with a lower said priority.

37. The method of claim 25, further comprising utilizing a light protocol, said protocol further comprising the steps of;
  (a) providing TCP over Ethernet;
  (b) removing CRC for TCP from communications packet;
  (c) removing IP from communications packet; and
  (d) using over Link Layer (2) for addressing.

* * * * *

UNITED STATES PATENT AND TRADEMARK OFFICE
CERTIFICATE OF CORRECTION

PATENT NO.        : 7,707,287 B2                                      Page 1 of 1
APPLICATION NO.   : 10/102810
DATED             : April 27, 2010
INVENTOR(S)       : Micha Shafir et al.

It is certified that error appears in the above-identified patent and that said Letters Patent is hereby corrected as shown below:

In column 27, lines 42-43, delete "bytenumber".

In column 29, line 14, delete "Oregan" and insert -- Oregon --, therefor.

In column 34, line 21, in claim 32, delete "claim 8" and insert -- claim 25 --, therefor.

In column 34, line 35, in claim 33, delete "claim 15" and insert -- claim 32 --, therefor.

In column 34, line 52, in claim 37, delete "of;" and insert -- of: --, therefor.

Signed and Sealed this
Fourth Day of January, 2011

David J. Kappos
*Director of the United States Patent and Trademark Office*